United States Patent [19]
Konishi

[11] Patent Number: 5,313,245
[45] Date of Patent: May 17, 1994

[54] AUTOMATIC FOCUSING DEVICE

[75] Inventor: Kazuki Konishi, Tokyo, Japan

[73] Assignee: Canon Kabushiki Kaisha, Tokyo, Japan

[21] Appl. No.: 72,860

[22] Filed: Jun. 7, 1993

Related U.S. Application Data

[63] Continuation of Ser. No. 715,747, Jun. 18, 1991, abandoned, which is a continuation of Ser. No. 579,096, Sep. 7, 1990, abandoned, which is a continuation of Ser. No. 443,038, Dec. 4, 1989, abandoned, which is a continuation of Ser. No. 184,931, Apr. 21, 1988, abandoned.

[30] Foreign Application Priority Data

| Apr. 24, 1987 | [JP] | Japan | 62-101382 |
| Apr. 24, 1987 | [JP] | Japan | 62-101384 |
| May 11, 1987 | [JP] | Japan | 62-114052 |
| May 25, 1987 | [JP] | Japan | 62-127343 |
| Jun. 24, 1987 | [JP] | Japan | 62-155342 |
| Aug. 18, 1987 | [JP] | Japan | 62-204613 |
| Aug. 18, 1987 | [JP] | Japan | 62-204614 |
| Aug. 18, 1987 | [JP] | Japan | 62-204615 |

[51] Int. Cl.$^5$ ............................................. G03B 13/36
[52] U.S. Cl. ................................. 354/402; 354/403; 354/408
[58] Field of Search ............... 354/400, 402, 403, 406, 354/407, 408

[56] References Cited

U.S. PATENT DOCUMENTS

| 4,470,681 | 9/1984 | Johnson | 354/403 |
| 4,534,636 | 8/1985 | Sugawara | 354/403 |
| 4,571,048 | 2/1986 | Sugawara | 354/403 |
| 4,614,418 | 9/1986 | Ishizaki et al. | 354/407 |
| 4,637,705 | 1/1987 | Kawabata | 354/403 |
| 4,639,110 | 1/1987 | Rinn et al. | 354/403 |
| 4,720,723 | 1/1988 | Harunari et al. | 354/403 |
| 4,720,724 | 1/1988 | Yokoo | 354/403 |
| 4,740,806 | 4/1988 | Takehana | 354/403 |
| 4,748,469 | 5/1988 | Tamura | 354/403 |
| 4,764,786 | 8/1988 | Tamura et al. | 364/403 |
| 4,768,053 | 8/1988 | Matsuda et al. | 354/403 |
| 4,827,303 | 5/1989 | Tsuboi | 354/403 |
| 4,843,415 | 6/1989 | Matsui et al. | 354/403 |

*Primary Examiner*—Russell E. Adams
*Attorney, Agent, or Firm*—Fitzpatrick, Cella, Harper & Scinto

[57] ABSTRACT

An automatic focusing device in which a plurality of points in a picture frame are measured in distance to form focusing information. The device is provided with weighting means for laying an emphasis on a substantially central portion of the picture frame and another emphasis on the near object distance when forming the above-described focusing information.

210 Claims, 15 Drawing Sheets

F I G.12
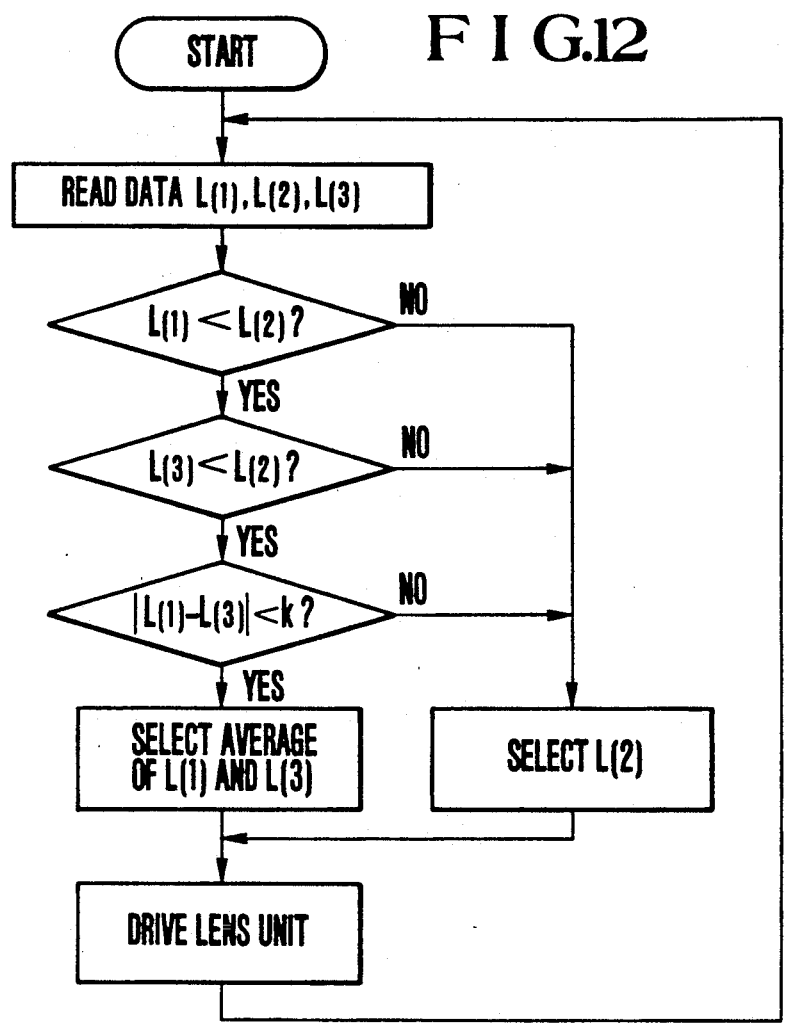
F I G.13
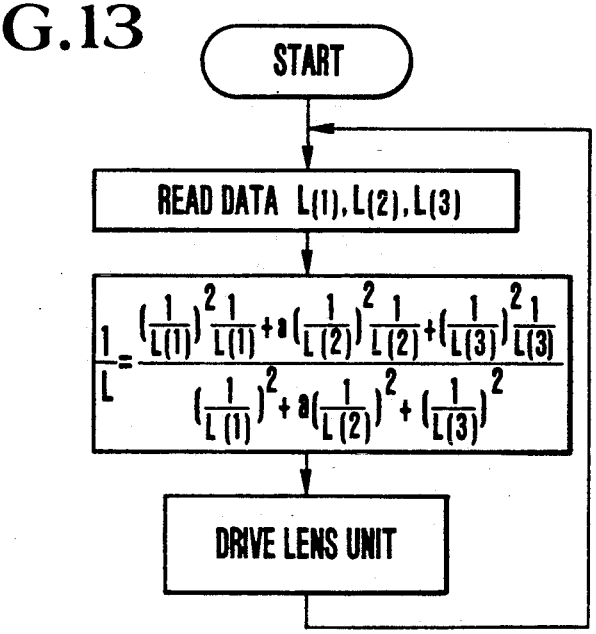

F I G. 20
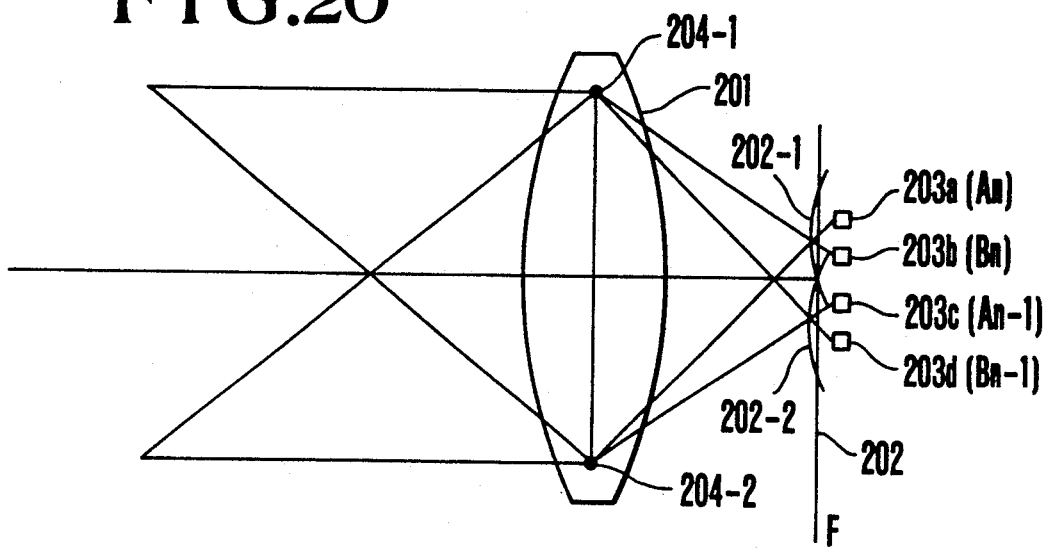
F I G. 21
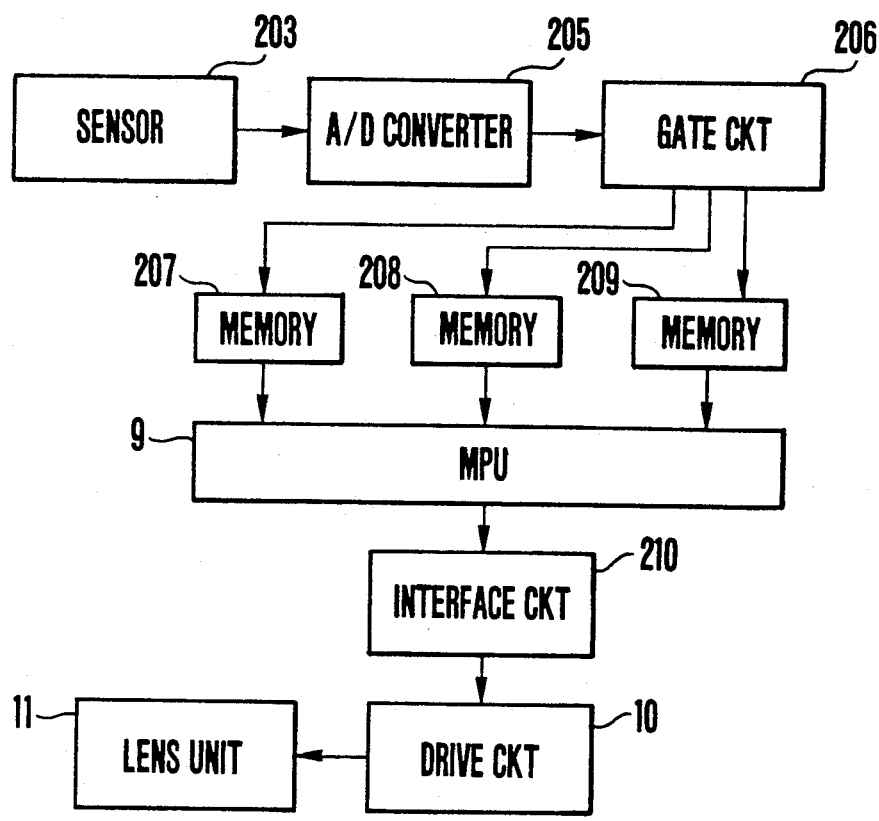

AUTOMATIC FOCUSING DEVICE

This application is a continuation of application Ser. No. 07/715,747 filed Jun. 18, 1991, which is a continuation of Ser. No. 07/579,096, filed Sep. 7, 1990, which is a continuation of Ser. No. 07/443,038, filed Dec. 4, 1989, which is a continuation of Ser. No. 07/184,931, filed Apr. 21, 1988, all now abandoned.

BACKGROUND OF THE INVENTION

1. Field of the Invention

This invention relates to automatic focusing devices for use in still cameras, video cameras, etc. and, more particularly, to automatic focusing devices in which a plurality of points in the picture frame are measured in distance, and focus adjustment information is formed on the basis of the results of distance measurement of these points.

2. Description of the Related Art

Devices of this kind for use in cameras, or devices of the so-called wide visual field distance measuring type (in which distance measurement is performed on a plurality of different points in the picture frame) have been proposed to eliminate the drawbacks of the conventional type automatic focusing device in which only one point of the picture frame is measured in distance. That is, that for a scene of two persons standing side by side, or a scene whose subject mainly a person) is out of the distance measuring area within the picture frame, these main objects fail to be sharply focused, as the focusing is effected at infinity.

What has so far been known as wide visual field distance measuring type automatic focusing device can be exemplified as follows:

(i) The type in which focusing is carried out based on one of the plurality of distance measuring results which is closest (for example, GENERAL & MECHANICAL 4582424, and Japanese Laid-Open Patent Applications Nos. Sho 61-88211 and;)

(ii) The type in which if a plurality of distance measuring results lie within the field depth determined by the focal length and aperture size of the photographic lens, focusing is adjusted to the average value so that all the objects corresponding to the plurality of points of distance measurement are sharply focused (Japanese Laid-Open Patent Applications Nos. Sho 56-101128, 61-88211, 61-55619 and 61-53614.);

(iii) The type in which depending on the brightness information, i.e., whether it is indoor or outdoor and, if outdoor, the focus is adjusted to the one of the plurality of distance measuring results which is farthest, or if indoor, it is adjusted to the closest one (Japanese Laid-Open Patent Applications Nos. Sho 61-55619 and 61-53614.)

But, the use of the above-described type (i) device leads to problem that for the scenes of a side by side arrangement of two persons and the corner location of a main object, although, in many cases, automatic focusing is effected on the person (the main object), if an obstacle lies in front of it, or there is a foreground, the photographic lens will be focused on these surroundings. So, it cannot be focused on the person (the main object).

In connection with the type (ii) device, it is natural that photographic situations where the measured values of distances to the all the points fall in a range for the field depth are very few in number except when a short focal length lens is used, or the ambient brightness is very high. At the time of using the long focal length lens, or of low brightness conditions, a drawback is invited in that the influence of the hand shake appears in the image, or the lens cannot be focused to any of the plurality of previously selected distances.

Further, in the above-described Japanese Laid-Open Patent Application No. Sho 56-101128 that discloses the type (ii) device, an attempt has been made to eliminate the above-described drawback even when the long focal length lens is in use, or the brightness of the object to be photographed is low. To this end, from the AE information for a given time, how deep the field depth is determined. This value of the field depth is then compared with the position of the object (the measured value of the object distance). In the case when it is found that all measured distance information does not fall within this field depth, a treatment to give an alarm to the photographer or to stop the shooting is carried out. But, the introduction of such an treatment gives rise to an alternative problem that a shutter opportunity is missed or the like.

Furthermore, the countermeasure in the type (iii) device is so short that in outdoor photography the sharp focus is apt to be effected on the background, while in indoor photography a front obstacle, etc. is often chosen in focusing, thus inviting a problem that the percentage of photographs of the person (main object) sharply focused is largely reduced.

This, in the automatic focusing device of the wide visual field distance measuring type according to the previous proposals, most of the photographic situations where two persons at the center of the target area stand side by side, or a person lies in the margin of the target area allow sharp focusing of the person as the main object). On the other hand, where the conventional distance measuring type (in which only one point of the picture frame is measured) is able to focus the lens on the main object, the focusing fails (instead, the lens is focused on the foreground or background.)

SUMMARY OF THE INVENTION

The present invention has been made to eliminate the above-described drawbacks of the prior known automatic focusing devices of the wide visual field distance measuring type. In an automatic focusing device in which a plurality of points in a picture frame are measured in distance to form focus adjustment information, weighting means is provided for laying an emphasis on the substantially central part of the area of the above-described picture frame and another emphasis on a short distance with an advantage that for various scenes, focusing on the main object is automatically obtained at a high rate.

Other objects of the invention will become apparent from the following description of embodiments thereof.

BRIEF DESCRIPTION OF THE DRAWINGS

FIG. 12 is a flowchart of an eighth embodiment of the invention.

FIG. 13 is a flowchart of a ninth embodiment of the invention.

FIG. 20 is a diagram of yet another embodiment of the distance measuring optical system.

FIG. 21 is a block diagram of another automatic focusing device having the distance measuring optical system of FIG. 20.

DETAILED DESCRIPTION OF THE PREFERRED EMBODIMENTS

Figure 1:
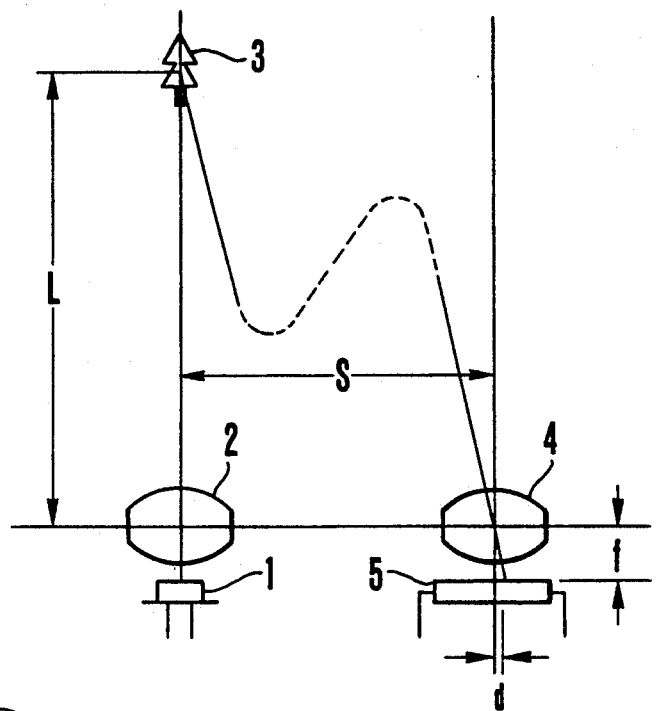
FIG. 1 is a diagram of geometry of the explaining the design parameters of the distance measuring optical system according to the invention.

The present invention is next described in detail based on embodiments shown in the drawings.

FIG. 1 shows a distance measuring optical system of the active type applicable to the invention. This type utilizes the trigonometrical survey method that has found use in lens-shutter cameras, etc.

In FIG. 1, spot light from a light projector 1 comprised of three light-emitting elements is collimated and projected by a projection lens 2 onto an object 3 to be photographed. This spot light is reflected from that object 3 and is focused by a collection lens 4 as a real image of the object 3 on a light-receiving surface of a sensor 5. The deviation d of the spot light from the center position on the light receiving surface of the sensor 5 is inversely proportional to the object distance L. The closer the object distance, the larger the deviation d becomes. This relationship may be expressed as:

$$f/L = d/S$$

where f is the focal length of the collection lens 4, and S is the length of the base line. It should be noted that, as to how many points must be used for distance measurement, it is determined depending on the application of the camera or the like instrument that uses that device, its cost, etc. Yet, in this embodiment, an example is taken with one point in the substantially central portion of the picture frame and two points in its marginal portion, totaling three points to be measured in distance.

Figure 2:
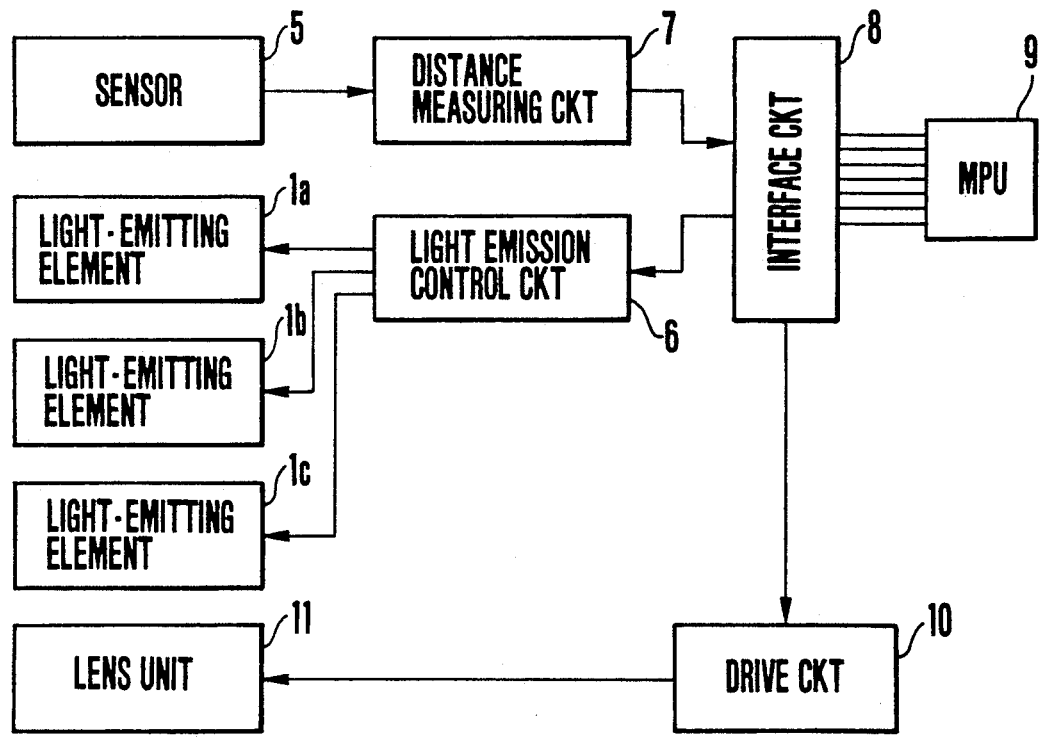
FIG. 2 is a block diagram of signal flows in an automatic focusing device having the distance measuring optical system of FIG. 1.

FIG. 2 in block diagram shows the structure of construction of an automatic focusing device having the distance measuring optical system of FIG. 1. In this figure, light-emitting elements 1a, 1b and 1c constitute the above-described light projector 1. The device further includes a light emission control circuit 6 for the light-emitting elements 1a-1c, a distance measuring circuit 7 responsive to of the output of the sensor 5 for computing the distance from the camera to the object 3, and an interface circuit 8 having an A/D converting function to connect a microprocessor unit 9 (hereinafter abbreviated to MPU) to the various circuits. The MPU 9 has a function of detecting the focus state to control a drive circuit 10 for a photographic lens unit 11, and performs other functions also.

Next, the operation is explained. When an "ON" state of a switch (not shown) is detected by the MPU 9, a light emission start signal is outputted from the MPU 9 through the interface circuit 8 to the light emission control circuit 6. Responsive to this signal, the light emission control circuit 6 starts to control sequential energization of the light emitting elements 1a-1c, in timing determined by various constants set in the circuit. Hence, these energized elements 1a-1c emit light which is projected by the projection lens 2 in the form of a series of spot light beams. As has been described before, each of these projected light beams is reflected from the object 3 and then received by the sensor 5 where it is converted to an electrical signal. It should be noted that the different spot light beams from the light-emitting elements 1a-1c are projected onto different objects in the target area such as those, for example, corresponding to points a, b and c shown in FIG. 3. The above-described output signal from the sensor 5 is applied to the distance measuring circuit 7 where distance information values representing the distances from the camera to the objects a, b and c are computed. These measured distance information values are transmitted in synchronism with the timing of energization of the light-emitting elements 1a-1c to the MPU 9 through the interface circuit 8. Based on these, the MPU 9 derives a focusing control signal (focus adjustment information). Responsive to this signal, the drive circuit 10 moves the lens unit 11 to bring the image of one of the objects 3 into sharp focus.

Figure 4:
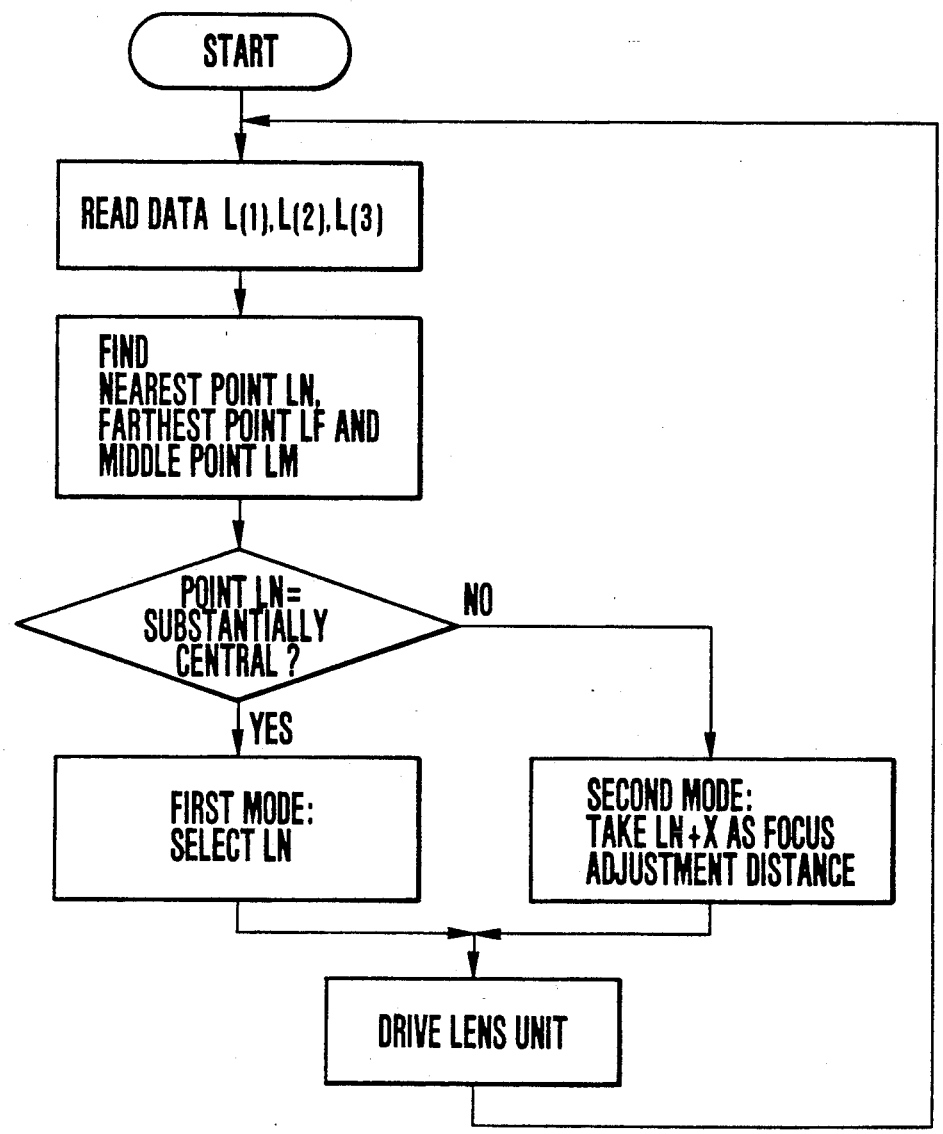
FIG. 4 is a flowchart of a first embodiment of the invention.

Next, a process for deriving the focusing control signal in the MPU 9 is explained according to the flowchart of FIG. 4.

The MPU 9 reads in the distance measurement result L(2) of the substantially central portion in the picture frame and the distance measurement results L(1) and L(3) of the marginal portions in the picture frame and first performs comparison of the result L(2) with each of the results L(1) and L(3). Of these, the nearest one is selected. Then, whether the object corresponding to the selected or nearest distance measurement result is the object of the substantially central portion in the picture frame or the object of the marginal portion in the picture frame is determined.

Next, in case when the nearest distance measurement result is the distance measurement result of the substantially central portion, a first mode wherein the object of the substantially central portion having the nearest distance measurement result is determined to be the main object is selected, and the distance information by the nearest distance measurement result is outputted to the drive circuit 10 to drive the lens unit 11.

That is, the first mode is that in the case of the usual situation where a person or a thing the size of a person is made the main object, because, as the position of the main object in the picture frame lies in the substantially central portion or even in the marginal portion, it is common that it takes its place on the front side of the other objects, and also because the main object is frequently composed at the substantially central portion of the picture frame, if the nearest distance measurement result is that of the substantially central portion, the object at the point for distance measurement of the substantially central portion is determined to be the main object.

Also, in the case when the nearest distance measurement result is found to be the one $L(1)$ or $L(3)$ corresponding respectively to the left or right point measured in distance of the picture frame, a second mode is selected.

The second mode is that the field depth obtained from the brightness information (the aperture value of the lens) and the focal length of the photographic lens is factored into the distance measurement result in such a way that a distance (X) corresponding to one half of that field depth is added to the computed value of the distance of the nearest object, and the added value is taken as the focus adjustment distance. A signal representing this value is applied as the focusing distance to the drive circuit 10 to drive the lens unit 11.

The second mode is explained in more detail below. In the case of the above-described usual photographic situation where a person or a thing of large size is the main object, even if the main object lies in the substantially central portion or in the marginal portion, it is common that it takes its place on the nearer side of the other objects. Meanwhile, it often occurs that the composition of the main object lies in the substantially central portion of the picture frame. Therefore, in the case when the nearest distance measurement result is not the point for distance measurement in the substantially central portion, but the point for distance measurement in the marginal portion, it is difficult to determine whether or not one of the objects which to the marginal, nearest point for distance measurement is the main one. So, the object which corresponds to the marginal, nearest point for distance measurement is tentatively deemed as the main object. Yet it also is impossible to deny that a farther object than the nearest object in the marginal portion is not the main one. For this reason, the distance to which the lens is to be focused is made longer than the marginal nearest distance by the distance (X) corresponding to one half of the field depth. By this, the lens is focused on both the marginal, nearest object and the object behind which would be the main one.

Therefore, according to this embodiment, when two persons are standing side by side in the substantially central portion of the picture frame, the first mode is selected so that the lens is focused on the main object or the two persons in the substantially central portion of the picture frame. Also when shooting another scene of a person on one-side of the picture frame, the second mode is selected so that without focusing on the background the shooting is carried out with a sharp focus of the person in the margin of the picture frame.

Next, another embodiment of the invention will be described.

Figure 5:
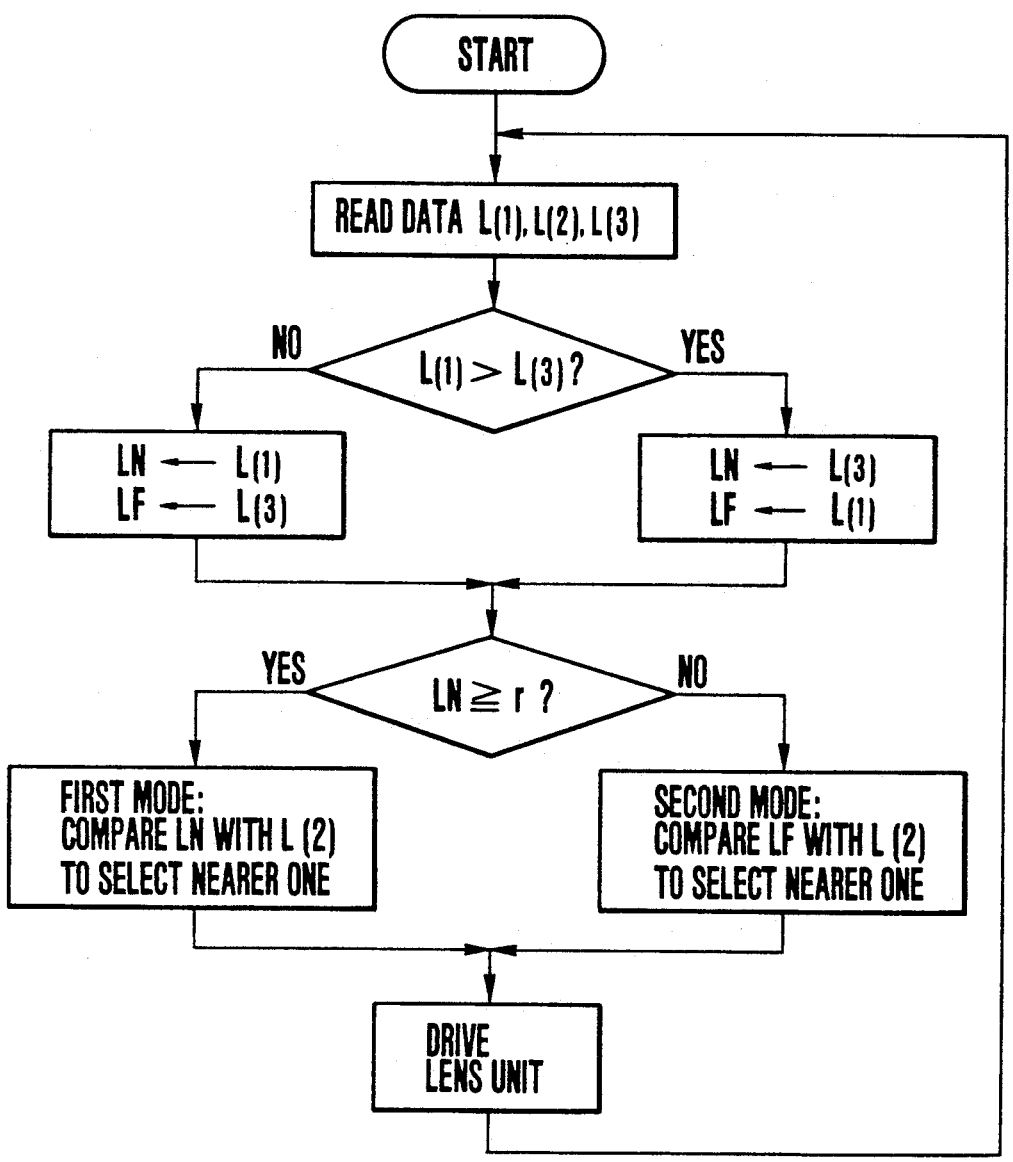
FIG. 5 is a flowchart of a second embodiment of the invention.

This embodiment uses the constructional features of the automatic focusing device shown in FIGS. 1 and 2 without alteration, but its difference from the foregoing embodiment resides only in the program for the operation of the MPU 9. This program is explained according to the flowchart of FIG. 5.

The MPU 9 reads in the distance measurement result $L(2)$ of the substantially central portion in the picture frame and those results $L(1)$ and $L(3)$ of the marginal portions in the picture frame, and first deals with the marginal portions of the picture frame by comparing their distance measurement results $L(1)$ and $L(3)$ with each other.

Here, in the case when the result $L(1)$ is on the nearer side than the result $L(3)$, $(L(1) \leq L(3))$, the marginal near distance (LN) is made to be $L(1)$, and the marginal far distance (LF) is made to be $L(3)$. In the converse case when the result $L(1)$ is on the farther side than the result $L(3)$ $(L(1) > L(3))$, $LN = L(3)$, and $LF = L(1)$ are set.

Next, the marginal near distance LN is compared with a previously set shoot limit near distance r.

This shoot limit near distance r is not the photographable minimum distance but a nearest distance in between objects based on the photographic conditions such as the focal length of the photographic lens and the brightness information from the object to be photographed, when, in the usual photographic situation, a person or a like object of as large size as the person is shot In general, it is rare to shoot the person or an object as large as the person at a shorter distance than the above-identified one. For example, in the case when the focal length of the photographic lens is 38 mm, it is a distance on the order of about $r = 1.3$ m. It should be noted that the reason why the brightness information is factored is that when in indoor photography, the position of the person tends to be on the near side as compared with when outdoor.

Then, on comparing the marginal near distance LN with the shoot limit near distance r, if $LN \geq r$, the first mode is selected. Also, if $LN < r$, the second mode is selected.

For the first mode, the marginal near distance LN is compared with the distance measurement result $L(2)$ of the substantially central portion, and the value of the near distance side as the focusing distance is outputted to the drive circuit 10 to drive the lens unit 11.

When operating the second mode, the marginal far distance LF is compared with the distance measurement result $L(2)$ of the substantially central portion, and the value of the near distance side as the focusing distance is outputted to the drive circuit 10 to drive the lens unit 11.

That is, the first mode is that in the case of a usual photographic situation where a person or an object as large as the person is made the main object, even if the position of the main object in the picture frame is in the substantially central portion or in the marginal portion, it is common that it takes its place on the nearer side than the other objects, and also the composition of the main object at the substantially central portion of the picture frame is varied, so that when usually shooting the person or an object as large as the person, whichever of the marginal near object positioned beyond the shoot limit near distance r and the object of the substantially central portion is nearer to the camera is determined as the main object.

Also, in the second mode, since the marginal near distance LN positions itself within the shoot limit near distance r, this marginal near distance LN is ignored (the marginal, yet too near object, or the object within the shoot limit near distance r of the margin of the picture frame is regarded as an obstacle because putting the main object there is unthinkable anyway). Therefore, from a similar point of view to the first mode, whichever of the marginal far object and the object of the substantially central portion is nearer to the camera is determined as the main object.

Therefore, when shooting, for example, the scene of two persons lying side by side or the scene of a person at the side, without focusing on an object existing in that distance which is rare to take portraits or the background, it becomes possible to focus the lens on the main object, in this instance, the person.

Next, another embodiment of the invention will be described.

Figure 6:
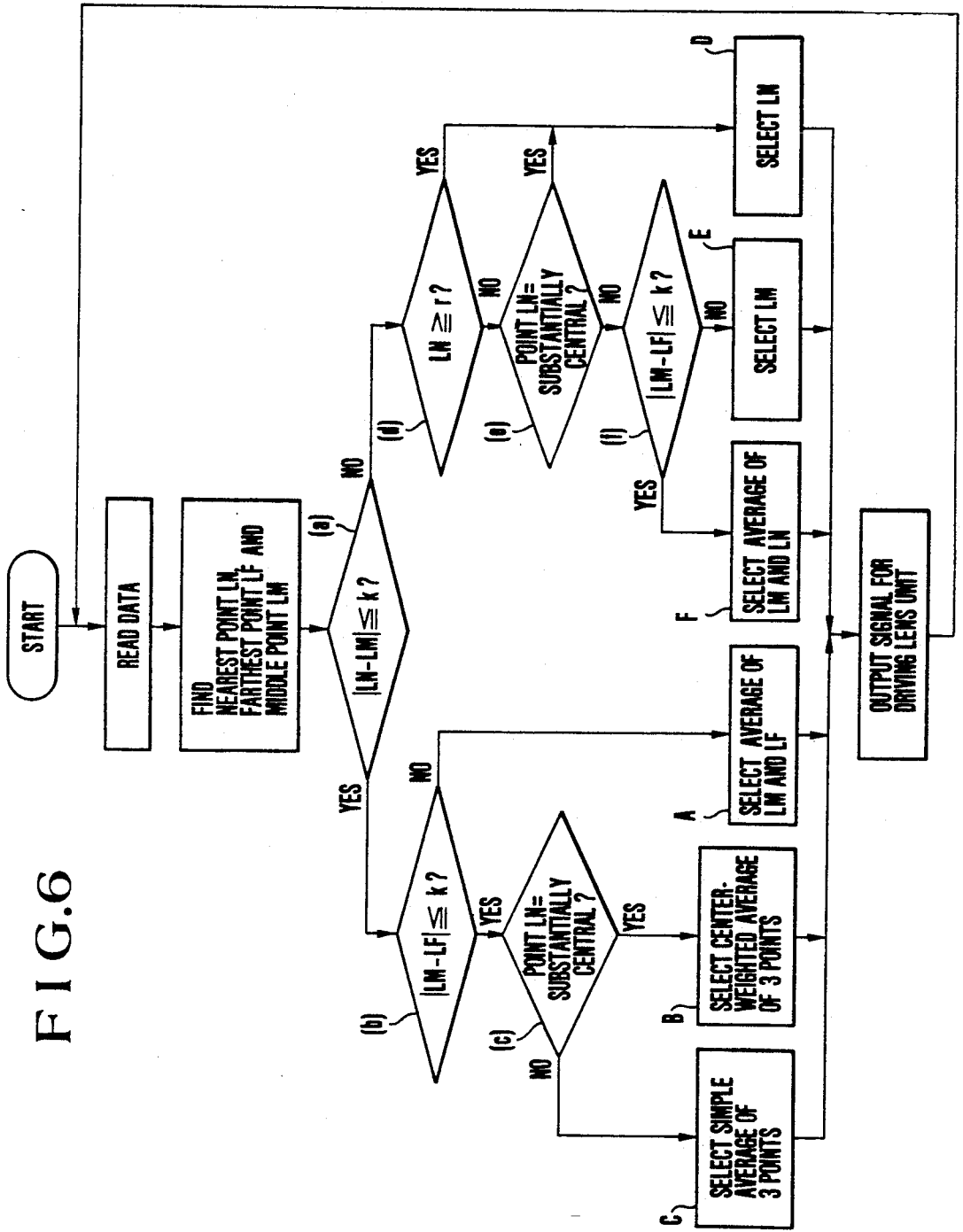
FIG. 6 is a flowchart of a third embodiment of the invention.

This embodiment uses the arrangement of the automatic focusing device shown in FIG. 1 and FIG. 2 as it is. Since the only point in which it differs from the before-described embodiment is a program for the operation of the MPU 9, this program is explained according to the flowchart of FIG. 6.

This example of the program for the operation of the MPU 9 is constructed with the following three main steps. That is, the first step is to detect the nearest point LN, the farthest point LF and the middle point LM on the basis of the above-described distance measurement results (hereinafter called the "first" step). The second step is to compare these LN, LM, LF results with one another and with other conditions to determine whether the focus position necessary to the scene the camera is about to shoot at the present time is different from the focus position necessary to any other scenes, whereby the cases of the pertinent scene and the other scene are divided (hereinafter called the "second" step). The third step is to derive the focus position suited to each of the scenes divided into the cases in the above-described second step by using previously set computing means (hereinafter called the "third" step).

At first, the above-described first step will be described. In this step, the distance measuring information values of the three points in the picture frame from the distance measuring circuit 7 are read in the MPU 9 where the nearest point LN, the farthest point LF and the middle point LM are found.

Next, the second step will be described. This step for this example is to set the number of divided cases to 6 in total. The priority order is that the difference between the above-described middle and nearest points LM and LN is first found. Then, this difference (or $|LN-LM|$) is compared with a constant k corresponding to the field depth determined by the focal length and F-number at full open aperture of the photographic lens. Depending on the discrimination between the effectiveness and ineffectiveness of the distance measurement result on the above-described nearest point LN (hereinafter called the discrimination "(a)"), the case division is carried out. The term "ineffectiveness" herein used means that its data are unnecessary to detect the focus position. (The same holds in the following.)

In each of the case where the nearest point LN is regarded as effective and the case where it is regarded as ineffective, the following respective discrimination is performed.

That is, concerning the former (the case of the effective nearest point), the difference between the above-described farthest and middle points LF and LM (or $|LM-LF|$) is found, and this difference is compared with the constant k corresponding to the field depth determined by the focal length and F-number at full open aperture of the photographic lens. Depending on the discrimination between the effectiveness and ineffectiveness of the distance measurement result on the farthest point LF (hereinafter called the discrimination "(b)"), the case division is carried out. And, the performance of that discrimination results in finding that the farthest point LF is effective (or $|LM-LF|\leq k$), a further discrimination of whether the nearest point LN is the substantially central point for distance measurement of the picture frame, or the other point for distance measurement (hereinafter called the discrimination "(c)") is carried out.

The introduction of this discrimination (c) is one of the features of this embodiment. Concerning this point, a further detailed explanation will be given later.

In such a manner, when the difference between the middle and nearest points LM and LN is not larger than k or $|LN-LM|\leq k$, it results that three different cases in all are divided.

Conversely when the difference $|LN-LM|$ is larger than the above-described constant k, ($|LN-LM|>k$,) it is in this example that whether or not the following conditions (I) and (II) are satisfied is determined in performing discriminations (hereinafter called the discriminations "(d)" and "(e)"). These discriminations are another one of the features of this embodiment. By this, whether the object lying at the nearest point is the main object or an obstacle is determined.

The conditions (I) and (II) taken as the criterion in the above-described discriminations (d) and (e) are defined as follows:

Condition (I):

The above-described nearest point LN is farther than the short distance r of a high possibility of occurrence of an obstacle guessed from the photographic conditions such as the focal length of the photographic lens and the brightness information (for example, in the case of the 38 mm lens, r=about 1 meter.)

Condition (II):

The point for distance measurement taken as the nearest point LN is the substantially central one.

By these discriminations (d) and (e), the case in which at least either of these conditions (I) and (II) is satisfied and the case in which neither of them is satisfied are divided. It should be noted that, concerning the latter (the case in which any one of them is not satisfied), by a furthermore discrimination between the effectiveness and ineffectiveness of the distance measurement result on the above-described farthest point LF (hereinafter called the discrimination "(f)"), the case division is carried out.

Therefore, even in the case of $|LN-LM|>k$, three cases in all are divided out as has been described above.

Next, the computation that is performed in the next step (third step) according to the case division described above will be explained.

When the case of an equal or smaller difference between the nearest and middle points LN and LM to or than the above-described constant k ($|LN-LM|\leq k$) is detected and selected, the distance measurement result to the nearest point LN is regarded as effective information as has been described above. In this case, further case divisions by the discriminations (b) and (c) follow. In summary, three scenes are differentiated. For these scenes, the respective suitable one of the three computation modes A, B and C described below is selected to be used in deriving the focus position.

A: (The case of $|LM-LF|>k$:)

From the average value of the LM and LN, the focus position is computed.

B: (The case of $|LM-LF|<k$ and the nearest point LN found by the discrimination (c) to be the point for distance measurement of the substantially central portion of the picture frame:)

The focus position is computed from the three points by the center-weighted average method.

C: (The case of $|LM-LF|<k$ and the nearest point LN found by the discrimination (c) to be the other point for distance measurement than that in the substantially central portion of the picture frame:)

The focus position is computed from the three points by the simple average method.

On the other hand in the foregoing, the event wherein the difference between the nearest and middle points LN and LM is larger than the above-described constant k ($|LN-LM|>k$) is detected and selected will be described. The distance measurement result on the nearest point LN is regarded as ineffective information as has been described above. And in this case, further case division of three scenes is carried out to determine different focus positions by the discriminations (d) and (e). From the following three formulae D, E and F suited to these, the respective appropriate one is selected to be used in deriving the focus position.

D: (The case that at least one of the above-described conditions (I) and (II) is satisfied:)

The focus position is computed from the LN. conditions (I) and (II)

E: (The case that neither of the is satisfied and $|LM-LF|>k$:)

The focus position is computed from the LM. conditions (I) and (II)

F: (The case that neither of the conditions (I) and (II) is satisfied and $|LM-LF|\leq k$:)

The focus position is computed from the average value of the LM and LF.

In the foregoing embodiment, the above-described results of the discriminations (a)-(c) which are the features of this embodiment are selected for employment in the computation suited to the computation modes D and C differentiated by the above-described case division.

That is, in these cases B, C, as $|LM-LF|\leq k$ and $|LM-LF|\leq k$, the three points can be said to be in a distance of the so-called "analogous (approximate)" scene. Even in such a scene, for example, when in closeup photography, or the background lies just behind the main object, if the focus position is computed based on the simple average values of the three points, there is a problem that the focus position is pulled backward as has been described above. Therefore, in the automatic focusing device of this embodiment, on consideration of it as usual that when in closeup photography or when such a scene as described above is encountered, the main object lies at the center, (on assumption of such an event) at first if the nearest point is the point for distance measurement of the substantially central portion of the picture frame, not the simple average but the center-weighted average is carried out to find the focus position. In the other cases, the simple average is employed.

In other words, the device of the invention can be said that, simply speaking, in the case when the three points lie at analogous (approximate) distances and when the nearest point is the substantially central point for distance measurement in the picture frame, the scene is regarded as having the emphasis at the nearest point. In the other cases, by taking into account the possibility of the nearest point being the obstacle, etc., the scene is not regarded as having the emphasis at the nearest point.

The computation of the focus position in the above-described center-weighted average case is performed to find the focus position LP by weighting the data of the nearest point based on the following formula:

$$LP=(a\cdot LN+LM+LF)/(a+2)$$

where a is a numerical value determined by taking into account the purpose of using the camera, the focal length of the lens, etc. wherein $a>1$, and the numerical value of 2–3 or thereabout is desirable. Also the LN, LM, LF and LP in the formula all represent the reduced values to the focusing movements in the lens control.

Also, the results of the discriminations (d)-(f) are selected as operations to which the computation modes D-F differentiated by the above-described case division are suited.

That is, the computation D is the case in which at least either one of "$LN\geq r$" and "point LN=substantially central" is satisfied. This is, the position of the main object in the picture frame is usually on the fore side of the other objects, but if that is the case of the marginal portion of the picture frame, there is also a possibility of it being an obstacle. So, the marginal object within the shooting limit near distance r into which the main object can hardly be considered to be put is regarded as the obstacle. In the case when, farther beyond that, there is an object of shortest distance, or when, because of almost no possibility of putting an obstacle in the substantially central portion of the picture frame, an object of the substantially central portion is the object of shortest distance, those objects are made the main object, and those object distances are selected. As many ones of the others than that as possible are made to be able to be covered by the field depth.

Next, another embodiment of the invention will be described.

Figure 7:
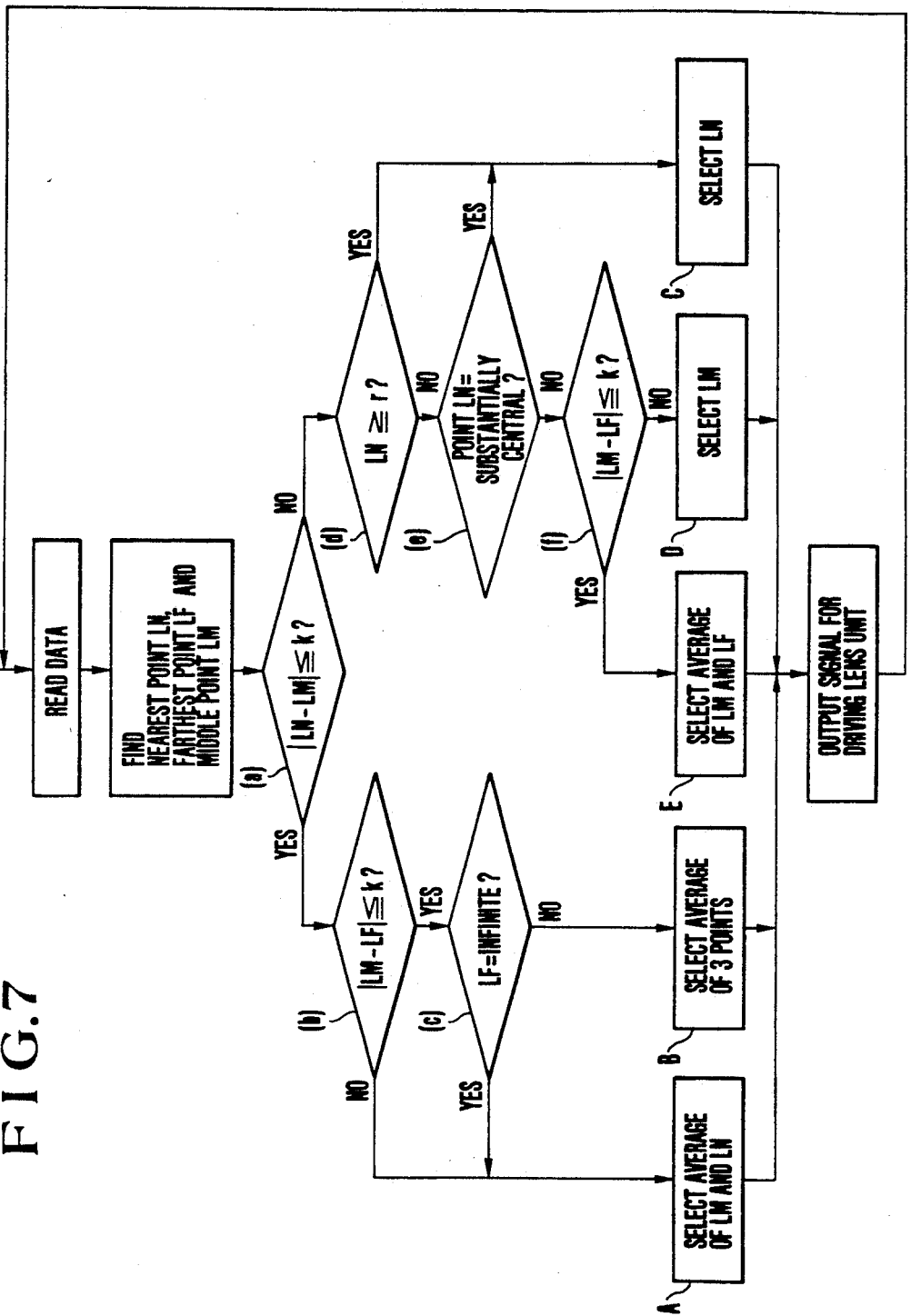
FIG. 7 is a flowchart of a fourth embodiment of the invention.

This embodiment uses the arrangement of the automatic focusing device shown in FIG. 1 and FIG. 2 as it is. The different point from the before-described embodiment is only in the program for the operation of the MPU 9. Therefore, this program is explained according to the flowchart of FIG. 7.

This example of the program for the operation of the MPU 9 is constructed with the following three main steps. That is, the first of these is the step in which, based on the above-described measured distance information values, the nearest point LN, the farthest point LF and the middle point LM are detected (hereinafter called the "first" step). The second is the step in which these distances LN, LM and LF are compared with one another and with other conditions to determine whether the focus position necessary to the scene the camera is to shoot at the present time is different from the focus position necessary to the other scenes, so that the pertinent scene and the other scenes are divided (hereinafter called the "second" step). The third is the step in which the focus position suited to each of the thus-divided cases of scenes is derived by using preset computing means (hereinafter called the "third" step).

At first, the above-described first step will be explained. In this step, the measured distance information values of the three points in the picture frame from the distance measuring circuit 7 are read in the MPU 9 where the nearest point LN. the farthest point LF and the middle point LM are found.

Next, the above-described second step will be explained. In this step of this example, the scenes are divided into five cases in total, and the order of priority is that at first the middle point LM is subtracted from the nearest point LN and then this difference (or $|LM-LF|$) is compared with the constant k corresponding to the field depth determined by the focal length and F-number at full open aperture of the photographic lens, etc. to perform the case division by a discrimination between the effectiveness and ineffectiveness of the distance measurement result on the above-described nearest point LN (hereinafter called the discrimination "(a)"). The term "ineffectiveness" herein used means that it is unnecessary data for detection of the focus position. (The same applies below.)

In the cases when the nearest point LN is regarded in the above as effective and when it is regarded as ineffective, the next respective discriminations follow.

That is, concerning the former (the case of the effective nearest point), the above-described farthest point LF is subtracted from the middle point LM, and this difference or $|LM-LF|$) is compared with the constant k corresponding to the field depth determined by the focal length and F-number at full open aperture of the photographic lens to perform the case division by discriminating between the effectiveness an-d ineffectiveness of the distance measurement result on the farthest point LF (hereinafter called the discrimination "(b)"). As a result of these discriminations, if the nearest and farthest points LN and LF both are effective to the middle point LM, it can be said to be a case that these three distance measuring values are almost equal in distance to one another.

And, in this example, for the case that the farthest point LF is effective (or $|LM-LF| \leq k$), a further discrimination of whether or not the farthest point LF is infinite (hereinafter called the discrimination "(c)") is performed.

To do this discrimination (c) is one of the features of this embodiment. In other words, in this case, as will be explained in detail below, if the farthest point LF is infinite, this will be ignored. Why the distance measurement result of the infinity is ignored is that when the main object is a person there is almost no possibility of this person existing at infinity. Also when the main object is other than the person, the possibility of one point alone taking its place at infinity is very low. On consideration of these, by ignoring the infinite one of the distance measurement results, the focusing is prevented from being pulled backward to make the image unsharp.

Also, in the active type of automatic focusing device as in this embodiment, there- is a case that the reflection of the projected spot light cannot focus a real image on the surface of the light-receiving element due to the influence of the shape and reflectivity of the object so that although the object actually lies in an effective distance, a distance measurement result corresponding to infinity is obtained. Therefore, even to remove such trustless data, it is advantageous to ignore the infinite one of the distance measurement results.

In the case when the farthest point LF is not infinite, the above-described three points are used to derive the focus position.

Turning back, in the case when the difference between the nearest and middle points LN and LM is larger than the constant k (or $|LM-LF| > k$), it is in this example discriminated whether or not the following conditions (I) and (II) are satisfied (hereinafter called the discriminations "(d) and (e)"). By this, determination of whether the distance measurement result of the nearest point is the main object or an obstacle is made as has been explained in the foregoing embodiments.

The conditions (I) and (II) as the criterion in the above-described discriminations (d) and (e) are defined as follows:

Condition (I):

The above-described nearest point LN is farther in distance than the near distance r of a high possibility of being the obstacle as suggested from the photographic conditions such as the focal length of the photographic lens, the brightness information, etc. (for example, in the case of a 38 mm lens, 1 meter).

Condition (II):

The point for distance measurement of the above-described nearest point LN is substantially central.

By these discriminations (d) and (e), the case that at least one of these conditions (I) and (II) is satisfied and the case that none of them is satisfied are divided. It should be noted that concerning the latter (the case of none of them satisfied), a furthermore case division is performed by discriminating between the effectiveness and ineffectiveness of the distance measurement result on the farthest point LF (hereinafter called the discrimination "(f)").

Hence, for $|LM-LF| > k$, after all the scenes are divided into the three cases as has been described above.

Next, according to the thus-divided cases, what computation is performed in the next step (the third step) is described.

When the case that the difference between the nearest and middle points LN and LM is not larger than the constant k $|LM-LF| \leq k$) is detected and selected by the discrimination (a), the distance measurement result on the nearest point LN is regarded as effective information as has been described above. For this case, further case divisions are performed by the discriminations (b) and (c), so that the scenes are divided into the two cases. Depending on these cases, a suitable one of the following two computation modes A and B is selected to derive the focus position.

A: (The case of $|LM-LF| > k$) or (the case that the farthest point LF is infinite.)

The focus position is computed from the average value of LM and LN.

B: (The case that $|LM-LF| \leq 1$ and the farthest point LF is found by the discrimination (c) not to be infinite.)

The focus position is computed by the average of the three points.

The opposite case to that described above or the one that a larger difference between the nearest and middle points LN and LM than the constant k ($|LM-LF| > k$) is detected and selected is explained The distance measurement result on the nearest point LN is regarded as ineffective information as has been described above. And, in this case, the further case divisions by the discriminations (d) and (e) are carried out to differentiate three scenes for different focus positions. For this purpose, a suitable one of the following three computation modes C, D and E is selected to derive the focus position.

C: (The case that at least one of the conditions (I) and (II) is satisfied.)

The focus position is computed from the LN.

D: (The case that none of the conditions (I) and (II) is satisfied and $|LM-LF|>k$.)

The focus position is computed from the LM.

E: (The case that none of the conditions (I) and (II) is satisfied and $|LM-LF|\leq k$.)

The focus position is computed from the average value of the LM and LF.

In the foregoing embodiment, the results of the above-described discriminations (a)-(c) which are the features of this embodiment are used when a suitable one of the computation modes A and B is selected depending on the divided cases.

That is, for the case of the mode A, the satisfaction of $|LN-LM|\leq k$ and $|LM-LF|\leq k$ can be said to be a scene having the three points in analogous (approximate) distances. Even with such a scene, when the case is, for example, that the farthest point LF is infinite, if the focus position is computed based on the simple average of the three points, there is a problem that the focus position is pulled back as has already been described. Therefore, the automatic focusing device of this embodiment can be said to be of the type that, for this case, on consideration of the points that the infinite point is not the distance measuring information indicative of the main object, or that the accuracy of to he infinite information is not always high, etc., the focus position for the given scene should be computed from the average of the nearest and middle points LN and LM.

Next, another embodiment of the invention, will be described.

Figure 8:
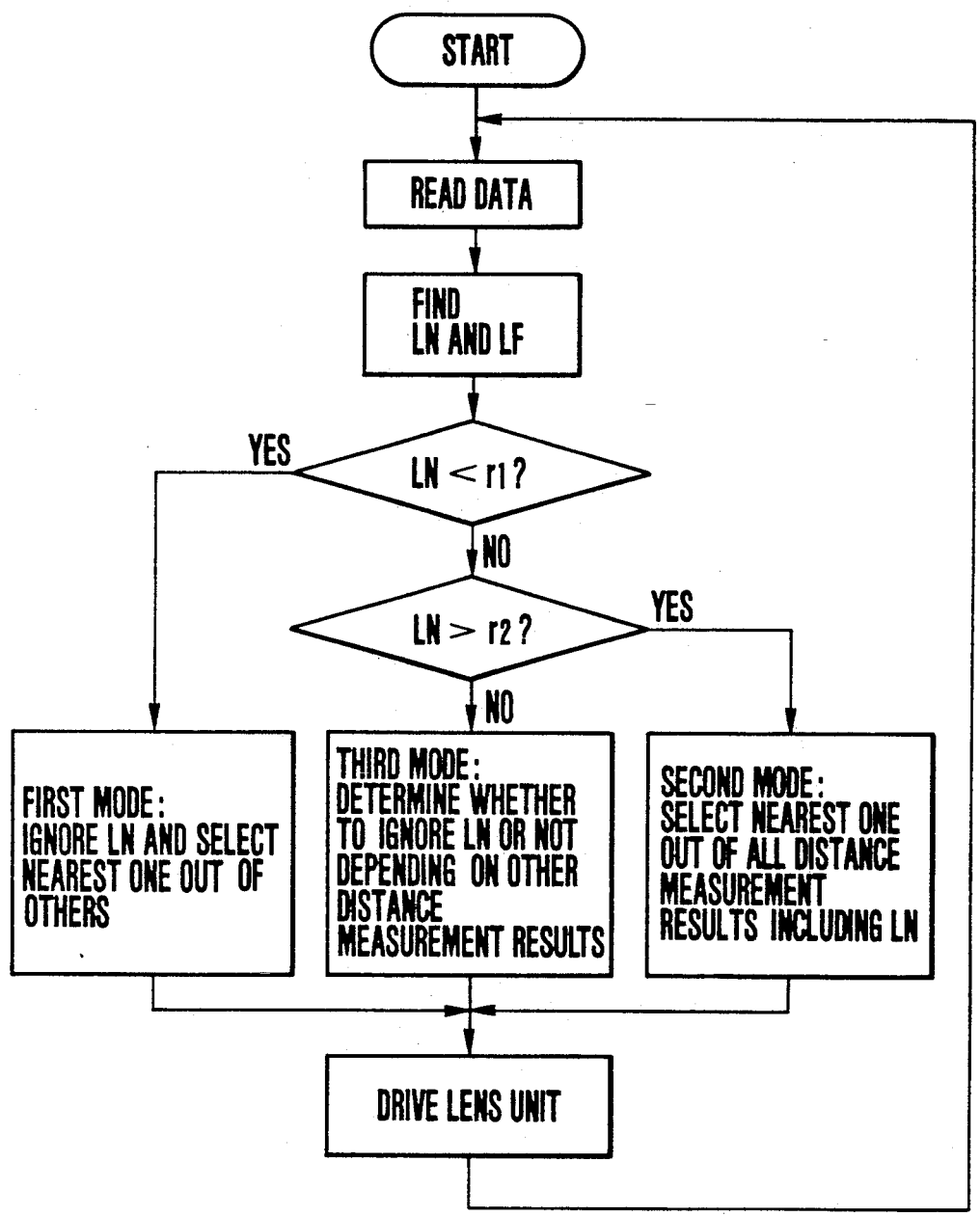
FIG. 8 is a flowchart of a fifth embodiment of the invention.

This embodiment uses the arrangement of the automatic focusing device shown in FIG. 1 and FIG. 2, and has a different point from the before described embodiments only in the program for the operation of the MPU 9. Therefore, this program is explained according to the flowchart of FIG. 8.

The MPU 9 reads in the distance measurement results of the three points in the picture frame and compares the distance measurement results of the two points in the marginal portion with each other to detect the distance of an object of the near distance side (hereinafter referred to as "LN") and the distance of an object of the far distance side (hereinafter referred to as "LF").

Meanwhile, in the MPU 9, r1: the distance wherein anything at a distance shorter than this is regarded as an obstacle, r2: the distance wherein anything at a distance not shorter than this is regarded not as the obstacle, r3: the distance wherein anything at a distance not shorter than this because of its image on the picture being small can hardly be regarded as the main object.

the threshold values r1, r2 and r3 are previously set by the focal length and the F-number at full open aperture of the photographic lens, etc. and usually the relationship in their largeness and smallness is set as $r1<r2<r3$.

And, LN is compared with r1. In the case of $LN<r1$, the marginal nearest object is determined to be an obstacle, and the first mode is selected.

The first mode makes the distance measuring value of the near side out of the distance measurement results of LF and the substantially central portion to be the focus position.

Next, in the case when the relationship between LN and r2 is $LN>r2$, the second mode is selected.

The second mode makes the nearest one of all the distance measuring values including LN to be the focus position.

Further in the case when the relationship of LN with r1 and r2 is $r1<LN<r2$, a third mode is selected to determine the focus position by discriminating whether or not what lies in the distance of LN is an obstacle.

The third mode is used to discriminate whether or not what lies at the distance of LN is an obstacle, the other two distance measurement results are used so that when any of the other distance measurement results is farther than r3, what lies in the distance of LN is determined to be the main object and the LN is made the focus position. In the other cases, what lies in the distance of LN is determined to be an obstacle, and, similarly to the first mode, the nearer one out of the distance measuring values of LF and the substantially central portion is made the focus position.

That is, on the assumption that the marginal two points for distance measurement are made deviated positions from the center of the area of the picture frame by $\pm 1/6$ (in the case of 70 mm lens, an angle of $\pm 5°$, or in the case of 35 mm lens, an angle of $\pm 10°$), then what lies at a shorter distance than the threshold value r1 becomes very large on the picture regardless of the photographic lens set on the wide angle or telephoto side, so that if the person (or as large a thing as the person) lies only on the marginal point for distance measurement, its image would partly present itself in the picture frame. It is unusual to shoot a person under such a composition. It is rare in the usual situations to shoot a person at a shorter distance than this threshold value r1. And when the person is perfectly put within the picture frame, it results that two of the points for distance measurement hit the person. From these facts, what is hit by only one of the marginal points for distance measurement is regarded as an obstacle, and the first mode that makes the nearer one out of the substantially central point for distance measurement and the LF the in-focus position is selected to assure that focusing is effected on the main object.

Also, the intermediate between the threshold values r1 and r2, when the lens of wide angle side is in use, usually is a distance at which to shoot a person. Therefore, even if the person (or as large a thing as the person) as the main object lies over only the marginal point for distance measurement, the image of the person cannot be mutilated by the frame of the picture. But, when a telephoto lens is used, the hitting of only the marginal point for distance measurement on the person implies that that person lies just near the frame of the picture, so that it is hard to judge whether or not the photographer is choosing what lies just at the frame of picture as the main object in his composition. Suppose the photographer determines the composition with what lies just at the side of the picture frame as the main object, then even when this object is completely entered in the picture frame, it often happens that two of the points for distance measurement (one of the marginal points and the substantially central point) do not hit it. But in the case of such a composition, there are many occasions of the object at the front with the landscape in the background. Therefore, the substantially central point for distance measurement and the other marginal point for distance measurement lie behind the main object. Because the rate of its occupation in the picture frame is small, the third mode is operated with the LN made the in-focus position.

Meanwhile, in the case when another object exists side by side with, and on a slightly fore side of, the main object, this other object becomes LN. But because the main object is positioned on the near side of r3, it is in the third mode that that other object is regarded as an obstacle. Therefore, the nearest one out of the substantially central point for distance measurement and LF is made the focus position. Usually such a composition is that the rate of occupation of the main object in the picture frame is large. Therefore, what lies at so short a distance than that as to jut out of the picture frame is hardly chosen as the main object. Hence, shooting with the sharp focus on the main object can be carried out.

Further, even if the photographic lens is a wide angle lens or a telephoto lens, in the case when the LN is present on the far side of r2, the person in the ordinary situation fully enters the picture frame. Therefore, the second mode that an object which lies on the near side with a large rate of occupation in the picture frame is made the main object, is selected.

In such a manner, the threshold values r1, r2 and r3 are determined by the focal length and F-number at full open aperture of the photographic lens, the ordinary shooting distance, the number of points for distance measurement, the distance measuring position, etc. but is mainly related to the size of the image on the picture (image magnification). It is, therefore, desirable that it varies continuously in such a form as to be proportional to the focal length of the lens.

Figure 9:
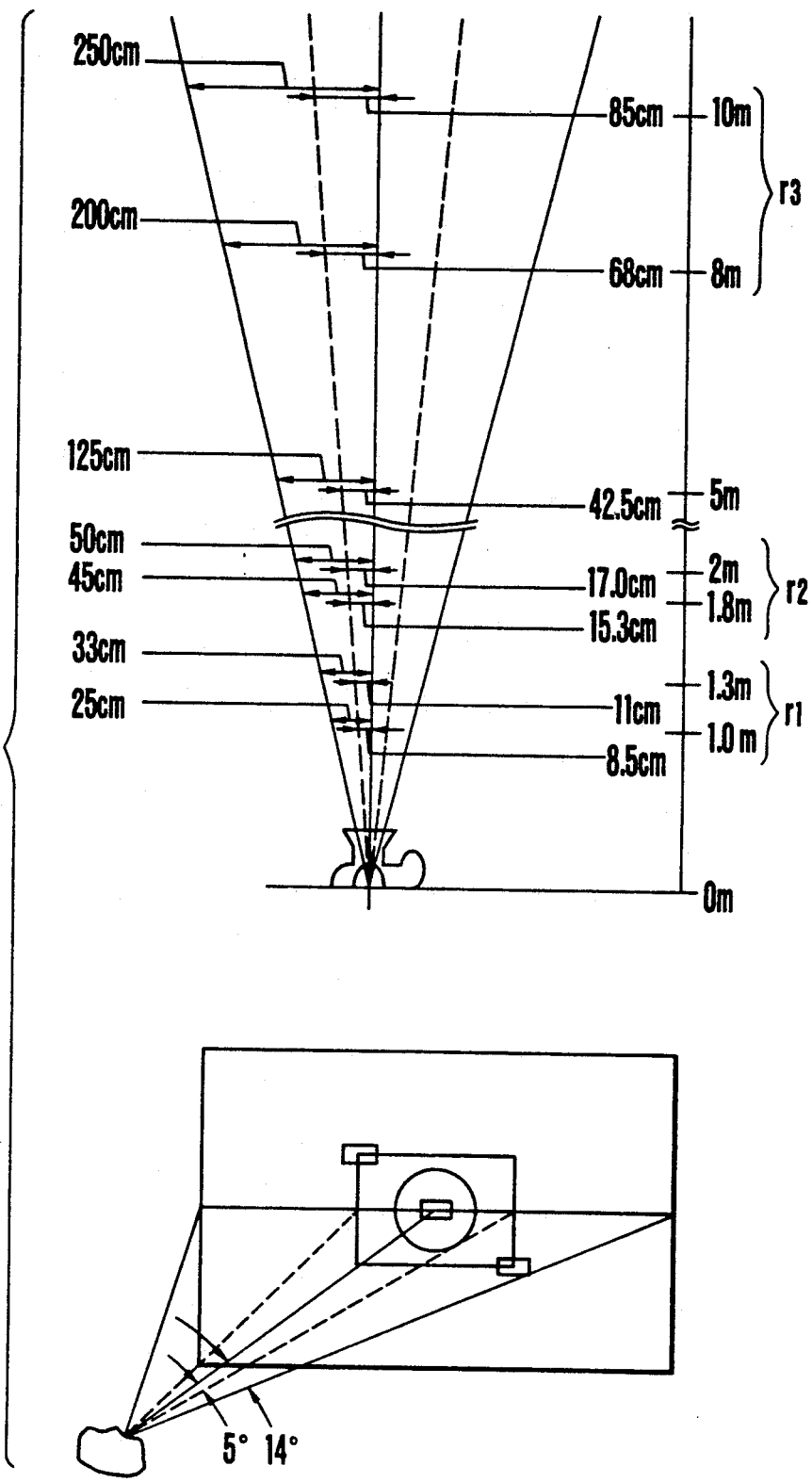
FIG. 9 comprises diagrams illustrating the relationship between the size of the picture frame and the marginal points of distance measurement when a photographic lens of 70 mm in focal length is in use.

As shown in FIG. 9, when the focal length of the used photographic lens is, for example, 70 mm with the field angle of $\pm 14°$ in the lateral direction, if the angle of distance measurement is $\pm 5°$, then in the shooting in the lateral position, for a shooting distance of 1 m, the total image angle (in the lateral direction) is $\pm 25$ cm, and the distance measuring position is $\pm 8.5$ cm; for 1.3 m, they are $\pm 33$ cm and $\pm 11$ cm respectively; 1.8 m, they are $\pm 45$ cm and $\pm 15.3$ cm; for 2 m, and $\pm 17$ cm; for 5 m, they are $\pm 125$ cm and $\pm 42.5$ cm; for 8 m, they are $\pm 200$ cm and $\pm 68$ cm; for 10 m, they are $\pm 250$ cm and $\pm 85$ cm, so that assuming that the size (lateral width) of the person is about 30 cm, at first, the threshold value r1 is found to be about 1-1.3 m. That is, what lies at a shorter than this distance, is very large. If the person (or as large a thing as the person) covers only the point for distance measurement in the marginal portion, it juts out of the picture frame. Also, this distance is very short as the actual distance between the photographer and the object, and is usually rare to shoot the person.

Next, the threshold value r2 is in the order of 1.8-2 m. That is, what lies in between r1 and r2 gives a large image. When the person is hit only by the marginal point for distance measurement, it lies close to the frame of picture. Also, a distance from r1 to r2 is usually the distance of a possibility of shooting a person (particularly when a wide angle lens is in use). Therefore, whether or not what lies in this range of distances is an obstacle is hard to determine. And, the threshold value r3 is in the order of 8-10 m. That is, a person farther (or a thing of as large size as the person) than this distance occupies less than 7% of the area of the picture frame, thus being so small that it can hardly be regarded as the main object.

Next, another embodiment of the invention will be described.

Figure 10:
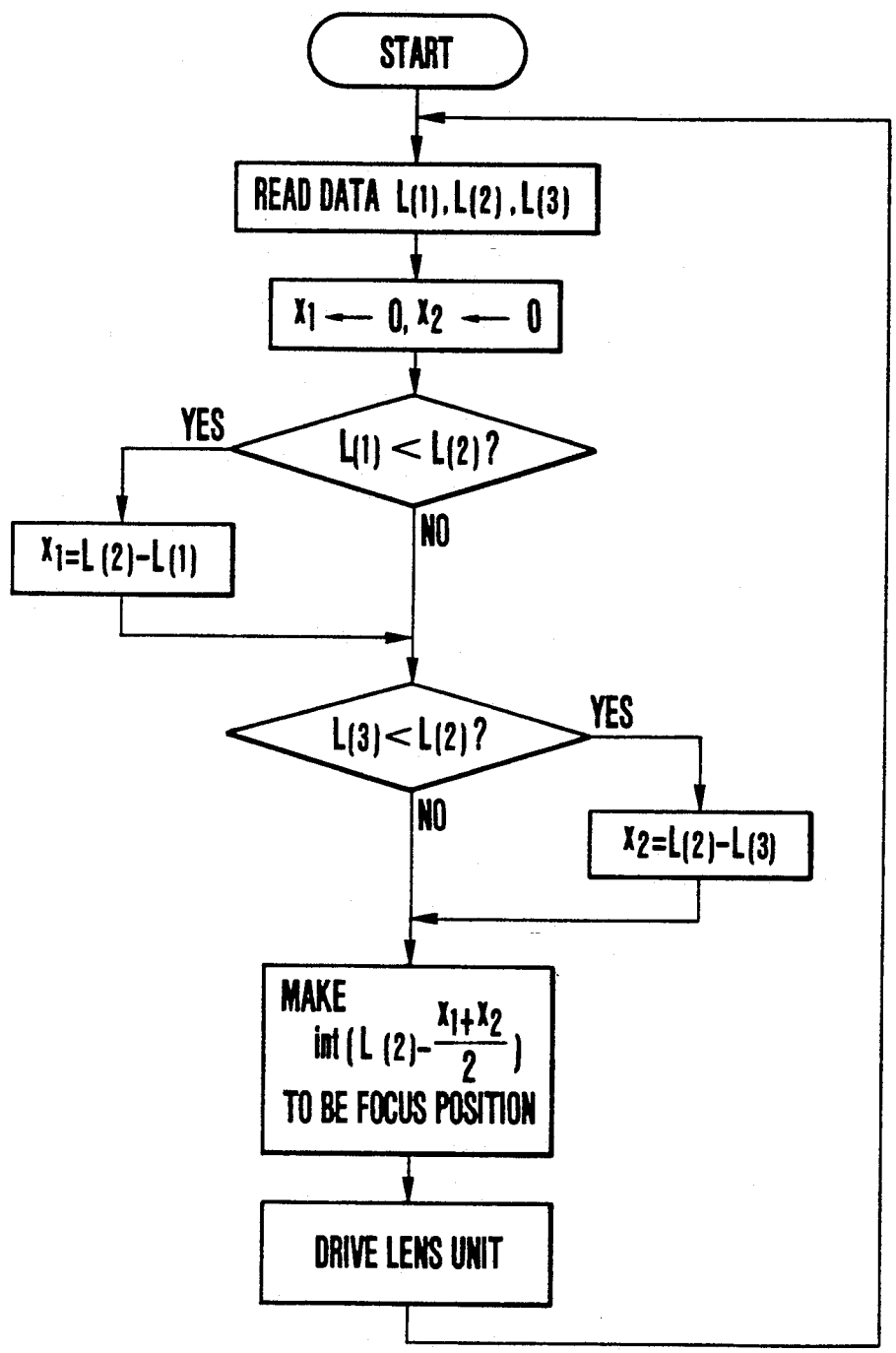
FIG. 10 is a flowchart of a sixth embodiment of the invention.

This embodiment uses the arrangement of the automatic focusing device shown in FIG. 1 and FIG. 2 as it is, and has the different point from the before-described embodiments only in the program for the operation of the MPU 9. Therefore, this program is only described according to the flowchart of FIG. 10.

The MPU 9 reads in the distance measurement results of three points in the picture frame and compares the marginal distance measurement results L(1) and L(3) with the substantially central distance measurement result L(2). In the case when L(1) or L(3) is on the nearer side than L(2), the difference x1 or x2 between L(1) or L(3) and L(2) is calculated. Then, ½ of the sum of these differences x1 and x2 is subtracted from L(2) to obtain a value, in other words, a nearer value than the measured value of distance of the substantially central portion by ½ of that sum. Making this value to be the focus position, the lens unit 11 is driven stepwise as 1 tooth, 2 teeth, 3-teeth, and so on in the order from the far side to the near side. Here, L(1), L(2) and L(3) each represent the number of teeth, wherein when $$L(2) \leq L(1), x1 = 0,$$

when $$L(2) \leq L(3), x2 = 0.$$

And, since L(1), L(2) and L(3) each are the number of teeth, the in-focus position must be defined in terms of the number of teeth. Therefore, the "int" function is used in changing it to an integer.

Therefore, the rate of in-focus on the object in the substantially central portion where the main object lies with a high probability is heightened, and focusing on an object in the marginal portion where an obstacle exists with a high probability is prevented from occurring.

Next, another embodiment of the invention will be described.

This embodiment uses the arrangement of the automatic focusing device shown in FIG. 1 and FIG. 2 as it is, and has the different point from the before-described embodiments only in the program for the operation of the MPU 9. Therefore, this program is only described according to the flowchart of FIG. 11.

The MPU 9 reads in the distance measurement results of three points in the picture frame and compares the distance measurement results L(1) and L(3) of the marginal portions with the distance measurement result L(2) of the substantially central portion. In the case when L(1) or L(3) is nearer than L(2), the difference x1 or x2 between L(1) or L(3) and L(2) is calculated. Then, a nearer value L than L(2) by ½ of the sum of the differences x1 and x2 is sought. It should be noted that in the case when L(1) or L(3) is farther than L(2), x1 or x2 is made zero. Further, L is compared with L(1) or L(3). In the case when this difference between L and L(1) or L(3) is larger than the constant k determined by the focal length and F-number at full open aperture of the photographic lens, etc., there is a high possibility of occurrence of an unsharp focus on any of the measured value of distance L(2) of the substantially central portion and L(1) or L(3) which becomes the measured value of the nearest distance. In this case, the measured value or the distance of the substantially central portion is made to be the focus position. And, in the case other than that, L is made to be the focus position.

Figure 11:
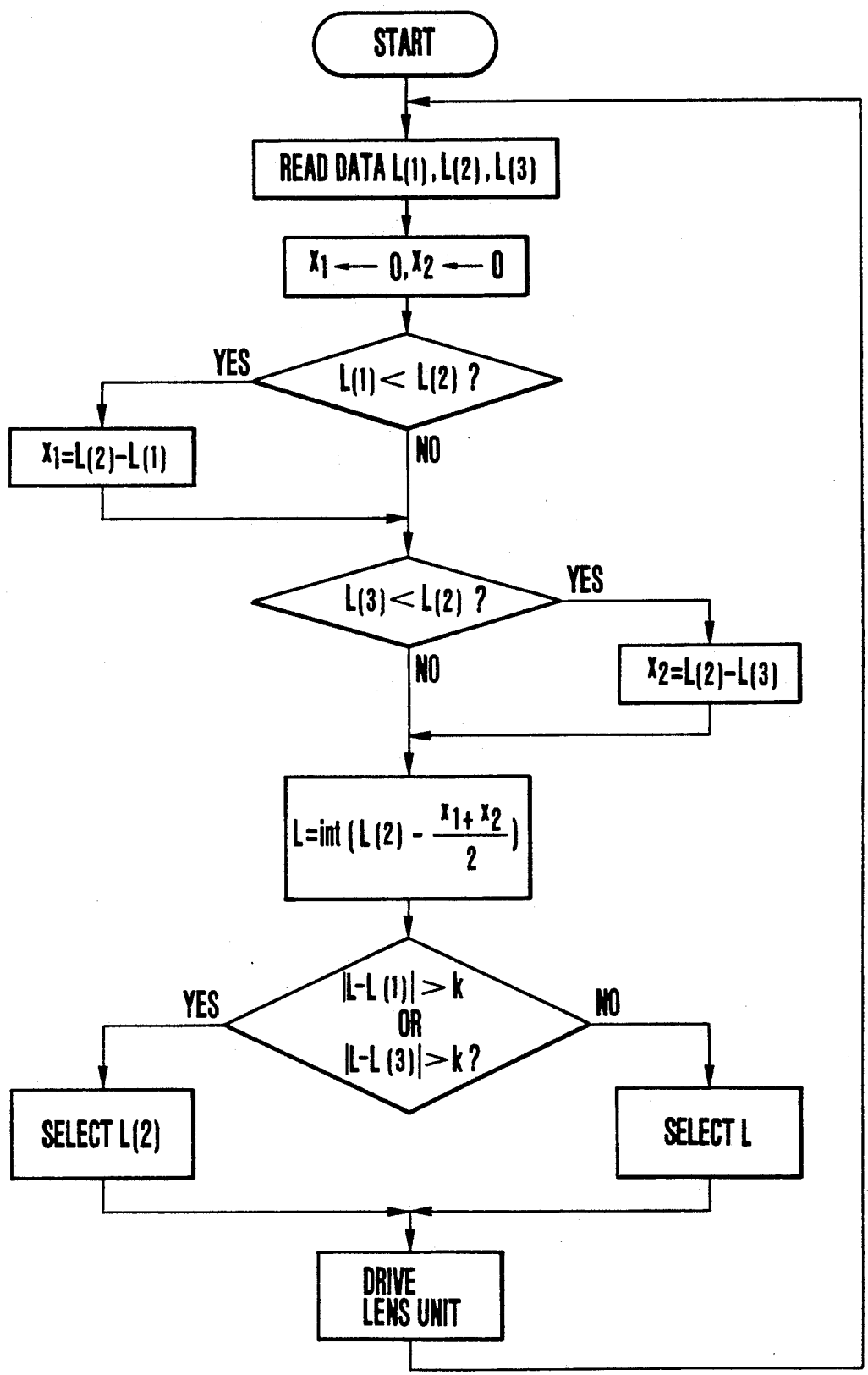
FIG. 11 is a flowchart of a seventh embodiment of the invention.

Also, the flowchart of FIG. 11 may be rewritten as in FIG. 12. For this case, if the measured distance values of the marginal portions both are shorter than the measured distance value of the substantially central portion, and are almost similar to each other (L(1)≃L(3)), the measured distance values of the marginal portions are made to be the focus position. Otherwise, the measured distance value of the substantially central portion is made to be the focus position. The judgement of L(1)≃L(3) is made depending on whether the absolute value of (L(1)−L(3)) is larger or smaller than the constant k determined by the focal length and F-number at full open aperture of the photographic lens, etc. That is, if $|L(1)-L(3)| < k$, L(1)≃L(3) is determined to be true. So, the average of L(1) and L(3) is made to be the focus position.

Next, another embodiment of the invention will be described.

This embodiment uses the arrangement of the automatic focusing device shown in FIG. 1 and FIG. 2 as it is, and has the different point from the before-described embodiments only in the program for the operation of the MPU 9. Therefore, this program is explained according to the flowchart of FIG. 13.

The MPU 9 reads in the distance measurement results of three points in the picture frame and calculates the focus position. Based on this calculation result, the drive circuit 10 controls the photographic lens unit 11. The MPU 9 averages the read distance measurement results of the three points according to the following formula and finds the focus adjusting distance L.

$$\frac{1}{L} = \frac{\left(\frac{1}{L(1)}\right)^2 \cdot \frac{1}{L(1)} + a\left(\frac{1}{L(2)}\right)^2 \cdot \frac{1}{L(2)} + \left(\frac{1}{L(3)}\right)^2 \cdot \frac{1}{L(3)}}{\left(\frac{1}{L(1)}\right)^2 + a\left(\frac{1}{L(2)}\right)^2 + \left(\frac{1}{L(3)}\right)^2}$$

where L(1), L(2) and L(3) represent the distances of the respective distance measuring points described in the above embodiments, a is a constant of about 2–5 as determined by the focal length of the lens and photographic conditions.

In this system, the distance measurement results of the three points are weighted-averaged with weights at the center and the near distance to effect an equivalent result to that of the before-described embodiments.

Next, another embodiment of the invention will be described.

This embodiment uses the arrangement of the automatic focusing device shown in FIG. 1 and FIG. 2 as it is except for the following point. That is, in this embodiment, the light emission control circuit 6 controls light emission in such a manner that the ratio of the projected amounts of light of the light-emitting elements 1a, 1b and 1c is 1:x:1 (where x is a weighting coefficient of about 2–5) and that the light-emitting elements 1a and 1b are lighted at the same time to project light onto the point "a" for distance measurement of the right-hand marginal portion in the picture frame as viewed in FIG. 3 and the point "b" for distance measurement of the substantially central portion (hereinafter called the "primary" light emission). Then, the light-emitting elements 1b and 1c are lighted at the same time to project light onto the point "b" of the substantially central portion and the point "c" of the left-hand marginal portion (hereinafter called the "secondary" light emission.)

Also, the distance measuring circuit 7 computes the weighted average (with a weight at the point for distance measurement of the substantially central portion) between the object distance corresponding to the right-hand marginal point "a" for distance measurement and the object distance corresponding to the substantially central point "b" for distance measurement obtained by the above-described primary light emission, and computes between the weighted average (with a weight at the point for distance measurement of the substantially central portion) the object distance corresponding to the left-hand marginal point "c" for distance measurement and the object distance corresponding to the point "b" for distance measurement of the substantially central portion obtained by the secondary light emission. In synchronism with the primary light emission timing and the secondary light emission timing, these weighted average distance measurement results are outputted to the interface circuit 8.

Figure 3:
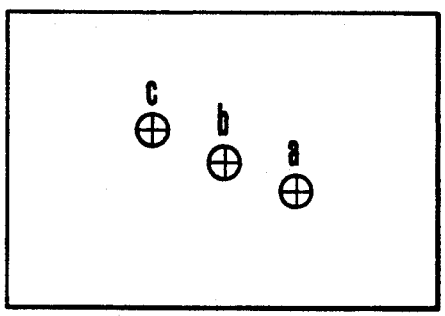
FIG. 3 is a plan view illustrating the positions of three projected light spot images in a picture frame by the distance measuring optical system of FIG. 1.

The operation of the automatic focusing device of this embodiment constructed as in the foregoing is as follows: At first, by turning on a switch (not shown), a light emission start signal from the MPU 9 is given to the light emission control circuit 6 through the interface circuit 8. By this, the light emission control circuit 6 operates with a timing given by various constants previously set in the circuit so that the primary light emission for lighting the light-emitting elements 1a and 1b and the secondary light emission for lighting the light-emitting elements 1b and 1c are started. The output light from each light-emitting element is reflected from the object to form a real image on the surface of the sensor 15. On reception of this reflected light, the sensor 15 produces an output which is applied to the distance measuring circuit 7 where the distances to the objects corresponding to the points for distance measurement in the picture frame shown in FIG. 3 are computed and the weighted average distance measurement results by the sequence of the primary and secondary light emissions are derived.

Each of the weighted average distance measurement results computed in this distance measuring circuit 7 are read in the MPU 9 through the interface circuit 8. In that MPU 9, as will be described below, the focus position is calculated. Based on that calculation result, movement of the photographic lens unit 11 to a predetermined position is carried out by the drive circuit 10.

Figure 14:
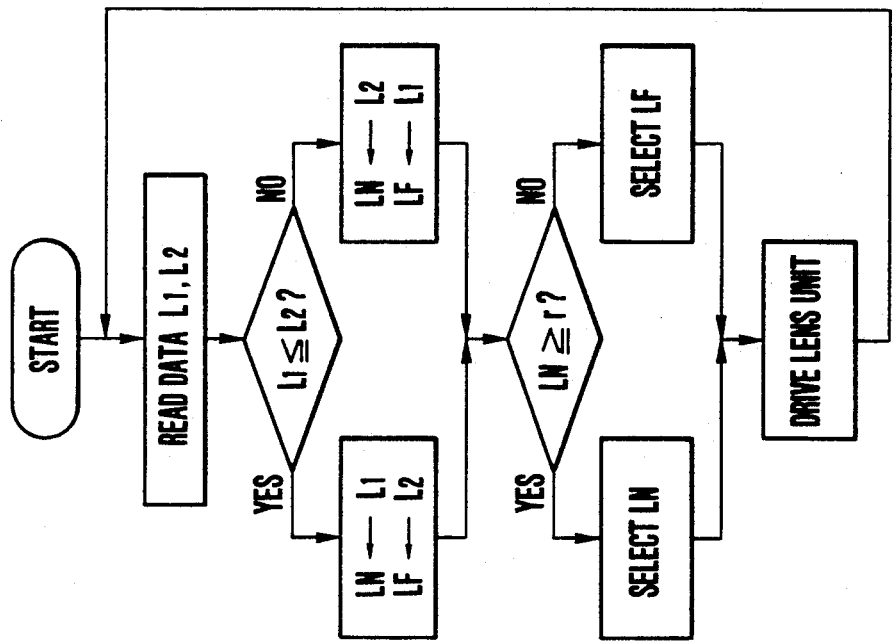
FIG. 14 is a flowchart of a tenth embodiment of the invention.

Next, the operation of the focus control signal derivation time performed in the above-described MPU 9 is explained according to the flowchart of FIG. 14.

The MPU 9 first reads in the weighted average distance measurement result L1 derived by the primary light emission timing (hereinafter called the "primary distance measurement" result) and the weighted average distance measurement result L2 derived by the secondary light emission timing (hereinafter called the "secondary distance measurement" result), and then compares the primary distance measurement result L1 and the secondary distance measurement result L2 to determine which is farther or nearer. The nearer one is labelled the near weighted average distance measuring result LN and the farther one is labelled the far weighted average distance measuring result LF.

Then, the near weighted average distance measuring result LN is compared with the preset shoot limit near distance r.

This shoot limit near distance r is not the photographable minimum distance, but is determined on the basis of the focal length of the photographic lens and the photographic conditions such as the brightness information from the object to be the nearest distance for shooting a person or as large an object as the person in the usual photographic situation. In general, it is rare to shoot the person or the object of as large as the person in a shorter distance than this limit near distance. For example, in the case when the focal length of the photographic lens is 38 mm, that distance is about r=1.3 m. It should be noted that why the brightness information is factored is that in indoor photography as compared with outdoor, the position of the person tends to be on the fore side.

And, the near weighted average distance measuring result LN and the shoot limit near distance r are compared with each other. In the case of LN≧r, the first mode is selected. Also, in the case of LN<r, the second mode is selected.

The first mode is that the near weighted average distance measuring result LN is outputted as the focus adjustment distance to the drive circuit 10 to drive the lens unit 11.

The second mode is that the far weighted average distance measuring result LF is outputted as the focus adjustment distance to the drive circuit 10 to drive the lens unit 11.

That is, the first mode is that in the case of the usual photographic situation where the person or the object of as large size as the person is made the main object, because, even if the position of the main object in the picture frame is in the substantially central portion or in the marginal portion, it is common that it takes its position on the fore side of the other objects, and also because there are many compositions of the main object in the substantially central portion of the picture frame. When the near weighted average distance measuring result LN is farther than the shoot limit near distance r of shooting the person or the object of as large size as the person in the usual photographic situation, it is possible to take either one of the marginal near object and the substantially central object as the main object. However, since, at this time, the near weighted average distance measuring result LN is the value obtained by weighting the object distance of the substantially central point for distance measurement, the near weighted average distance measuring result LN is made to be the focus adjustment distance. Therefore focusing is effected on the object in the substantially central portion of the picture frame in which the main object lies with a high probability, and, moreover, the focusing is effected on the object of the marginal portion as well.

Also, the second mode is such that since the near weighted average distance measuring result LN is positioned within the shoot limit near distance r, the object corresponding to the marginal near point for distance measurement is not the main object, but either one of the objects corresponding to the marginal far and substantially central points for distance measurement is taken as the main object. Thus, the far weighted average distance measuring result LF is made to be the focus adjustment distance. Because this far weighted average distance measuring result LF, too, is the value obtained by weighting the object distance of the point for distance measurement of the substantially central portion, focusing is effected on the object of the substantially central portion of the picture frame where the main object lies with a high probability, and, moreover, the focusing is effected on the marginal far object as well.

Therefore, when shooting a scene of two persons lying side by side or a scene of a person lying close to the side of the picture frame, focusing is not effected on the object or background existing within the distance where portrait photography is rare, but it becomes possible to effect focusing on the person as the main object.

Figure 15:
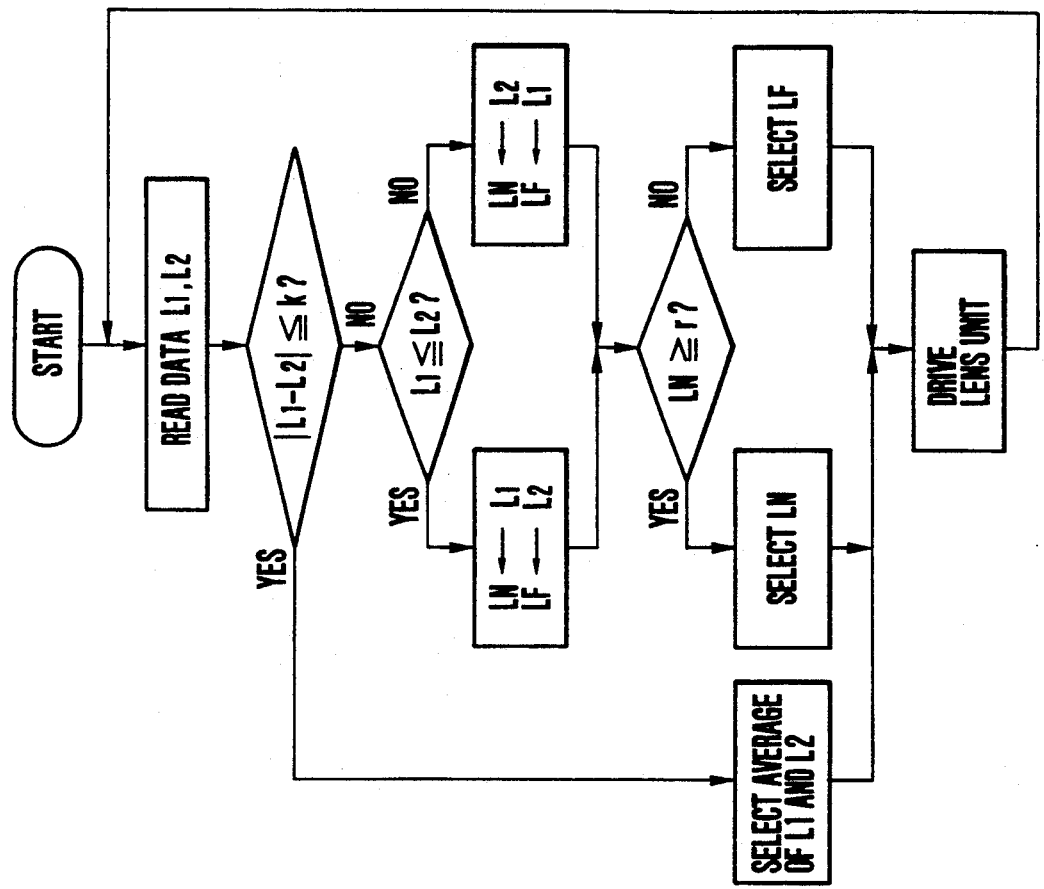
FIG. 15 is a flowchart of an eleventh embodiment of the invention.

Also, the flowchart of FIG. 14 may be rewritten as in the flowchart of FIG. 15. For this case, the MPU 9 reads in the primary distance measurement result L1 and the secondary distance measurement result L2 from the distance measuring circuit 7, and first compares the primary distance measurement result L1 with the secondary distance measurement result L2 to find their difference (hereinafter called the measured distance difference).

Then, this measured distance difference is compared with the constant k corresponding to the field depth determined by the focal length and F-number at full open aperture of the photographic lens, etc.

And, in the case when the measured distance difference is within the constant k, the first mode is selected so that the average value of the primary and secondary distance measurement results L1 and L2 is made to be the focus adjustment distance.

That is, the fact that the difference between the primary and secondary distance measuring results L1 and L2 is smaller than the constant k corresponding to the field depth determined by the focal length and F-number at full open aperture of the photographic lens, etc. implies that the objects in the points for distance measurement may be assumed to lie in a relatively narrow range of distances. Since, in such a case, there are many occasions that not only the object corresponding to the substantially central point for distance measurement, but also the objects corresponding to the marginal near and marginal far points for distance measurement are taken as the main objects, the average value of the primary and secondary distance measurement results L1 and L2 is made to be the focus position. Therefore, a suitable position within the full open depth of the primary and secondary distance measurement results L1 and L2 becomes the focus position. Therefore, the image of the object corresponding to the point for distance measurement of the substantially central portion is in sharp focus, and at the same time even the images of the objects corresponding to the marginal near and marginal far points for distance measurement also can be brought into focus.

Also, in the case when the measured distance difference is larger than the constant k, the primary and secondary distance measurement results L1 and L2 are compared with each other to determine which is farther or nearer. The nearer one is made the near weighted average distance measuring result LN, and the farther one is made the far weighted average distance measuring result LF. Then, the near weighted average distance measuring result LN and the shoot limit near distance are compared with each other.

And, if the near weighted average distance measuring result LN is farther than the shoot limit near distance r, the second mode is selected so that the near weighted average distance measurement result LN is made to be the focus position. If the near weighted distance measurement result LN is shorter than the shoot limit near distance r, the third mode is selected so that the far weighted distance measuring result LF is made to be the focus position.

That is, the fact that the difference between the primary and secondary distance measurement results L1 and L2 is larger than the constant k corresponding to the field depth determined by the focal length and F-number at full open aperture of the photographic lens, etc. implies that the objects in all the points for distance measurement cannot be assumed to lie in a relatively narrow range of distances. In such a case, an emphasis is laid on the object corresponding to the substantially central point for distance measurement, when the focus position is determined likewise as in the first and second modes of the above-described first embodiment.

Therefore, according to this embodiment, for example, in the case of a scene having a plurality of persons standing in a lateral line or huddling together, the first mode is selected to permit a shot to be taken with the sharp focus on all the persons. In the case of another scene having a person close to the side of the picture frame, the second mode is selected to permit a shot to be taken with the sharp focus not on the background but on the person. Further, even if obstacles such as branches of trees or the like exist in the foreground of the photographer, a shot can be taken with the sharp focus not on the branches but on the main object such as a person, because the third mode is selected.

Though, in this embodiment, the amounts of light emission of the light-emitting elements 1a, 1b and 1c are controlled to 1:x:1 by the light emission control circuit 6 in order to lay an emphasis on the object corresponding to the point for distance measurement of the substantially central portion of the picture frame, the weighting of the measured value of distance in the substantially central portion may otherwise be carried out optically by providing an ND filter in front of each of the light-emitting elements 1a and 1b and by equalizing the amounts of light emission of all the light-emitting elements to one another. Another example of a variation is that a pair of reflection mirrors are arranged on either side of the sensor 5 in an inclined relation to direct the reflected light beams from the objects of the marginal points for distance measurement respectively to the sensor 5, and an ND filter is put on the surface of each of the pair of reflection mirrors so that on the light reception side, the measured value of distance in the substantially central portion is optically weighted.

Next, another embodiment of the invention will be described.

Figure 16:
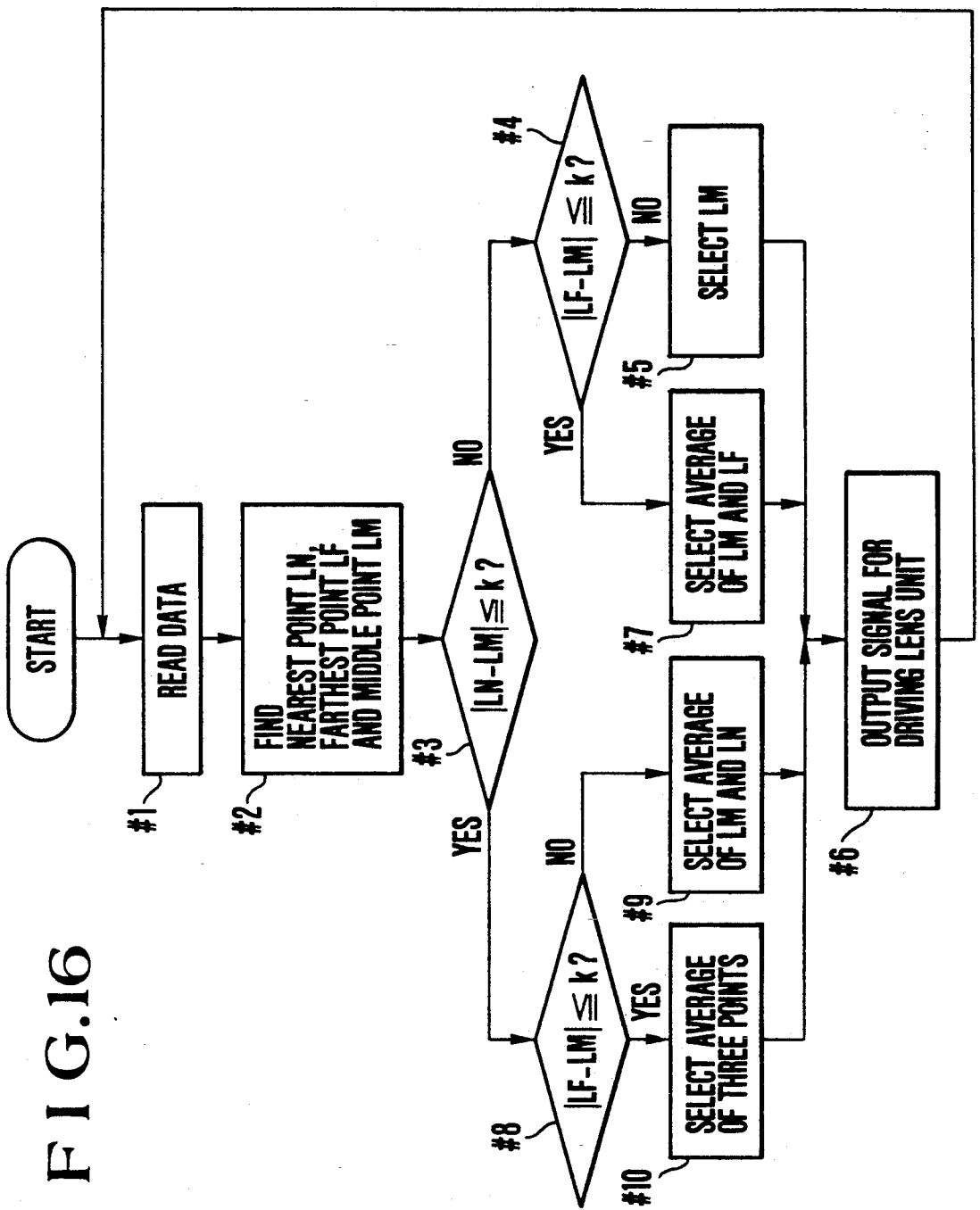
FIG. 16 is a flowchart of a twelfth embodiment of the invention.

This embodiment uses the arrangement of the automatic focusing device shown in FIG. 1 and FIG. 2 as it is and has the different point from the before-described embodiments only in the program for the operation of the MPU 9. Therefore, this program is only described according to the flowchart of FIG. 16.

At first, the MPU 9 reads the distance measurement results of three points in the picture frame sent from the distance measuring circuit 7 through the interface circuit 8 (step #1) and therefrom finds the nearest point LN, the middle point LM and the farthest point LF (step #2). Then, the middle point LM as the reference is compared with the nearest point LN (step #3). In the case when their difference is larger than the constant k determined depending on the focal length and F-number at full open aperture of the photographic lens, the number of points for distance measurement, etc., the nearest point LN is ignored. In this step, only the middle point LM is regarded as the effective distance measurement result. Then the flow advances to a step #4 where by now the middle point LM is compared with the farthest point LF. In the case when their difference is larger than the constant k, the farthest point LF is ignored so that in such a situation only the middle point LM is regarded as the effective distance measurement result (step #5). A focusing control signal representative of this middle point LM is then produced (step #6). Also, in the step #4, when the comparison of the middle and farthest points LM and LF results in that their difference is smaller than the constant k, as both of the middle and farthest points LM and LF are regarded as the effective distance measurement results, the average value is calculated (step #7). A focusing control signal representative of this average value is then produced (step #6).

Meanwhile, in the step #3, when the comparison of the middle and nearest points LM and LN results in that their difference is smaller than the constant k, both of the nearest and middle points LN and LM are regarded as the effective distance measurement results. Then the flow advances to a step #8. Here, the middle point LM is compared with the farthest point LF. In the case when their difference is larger than the constant k, the farthest point LF is ignored. As the nearest and middle points LN and LM are regarded as the effective distance measurement results, the average value is then found (step #9). A focusing control signal representative of this average value is then produced (step #6). Also, in the above-described step #8, when the comparison of the middle and farthest points LM and LF results in that their difference is smaller than the constant k, as the nearest, middle and farthest points LN, LM and LF all are regarded as the effective distance measurement results, the average value is derived (step #10). A focusing control signal representative of this average value is then produced (step #6).

Each of the foregoing embodiments has been described in connection with the case of using three points in distance measurement as shown in FIG. 3 for the purpose of simplicity. The number of points for distance measurement may be increased to 4 or 5 or more. As the number of points for distance measurement increases, the value of the constant k determined by the focal length and full open F-number of the lens and the number of points for distance measurement is only changed. The subsequent procedure for computation, when executed in exactly the same way as in the case of the three points, gives an identical result.

Also, though the distance measuring device of each of the foregoing embodiments has been described as using three light-emitting elements in projecting light onto objects of the three points for distance measurement in the picture frame, this may otherwise be done as shown in FIG. 17(a), 17(b), 17(c) and 17(d) where two light-emitting elements can suffice for projecting light onto objects of all the three points for distance measurement in the picture frame.

A distance measuring device 17(a) makes use of a light shielding mask 12 in front of the two light-emitting elements 1d and 1e. This mask 12 has two small holes 12a and 12b in opposition to the light-emitting elements 1d and 1e respectively, whereby light from the light-emitting elements 1d and 1e is projected through the small holes 12a and 12b onto an object in the substantially central portion. Onto a left-hand side object is projected light from the light-emitting element 1e through the small hole 12a. Onto a right-hand side object is projected light from the light-emitting element 1d through the small hole 12b.

Figure 17A:
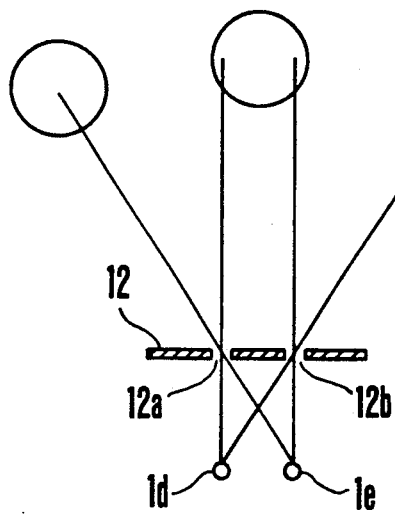
FIGS. 17(a), 17(b), 17(c) and 17(d) are diagrams of other practical examples of the distance measuring optical system.
Figure 17B:
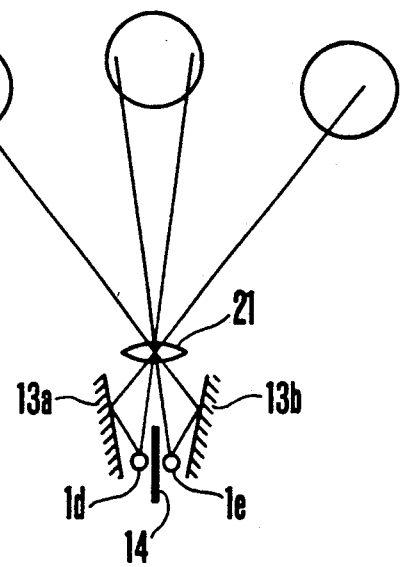
Figure 17C:
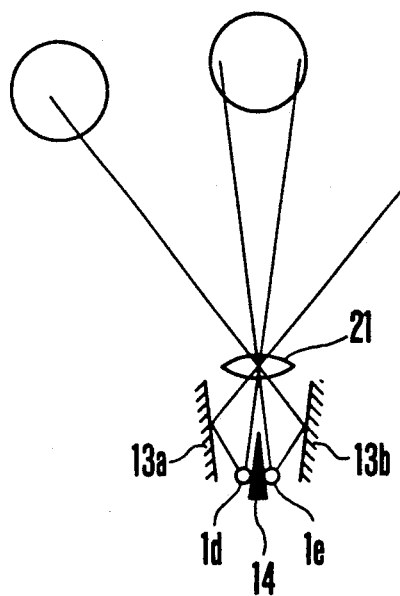

Another distance measuring device of FIG. 17(b) makes use of a pair of spaced and confronting reflection mirrors 13a and 13b with a light shielding plate 14 of flat form therebetween. The light-emitting elements 1d and 1e are arranged in the spaces between either of the reflection mirrors 13a and 13b and the light shielding plate 14 so that the light from the light-emitting elements 1d and 1e is projected directly by a projection lens 21 onto an object in the substantially central portion. The light from the light-emitting element 1d after having been reflected from the reflection mirror 13a is projected onto a right-hand side object. The light from the light-emitting element 1e after reflected been from the reflection mirror 13b is projected onto a left-hand side object. The light shielding plate 14 may otherwise be formed to a wedge shape as shown in FIG. 17(c).

Figure 17D:
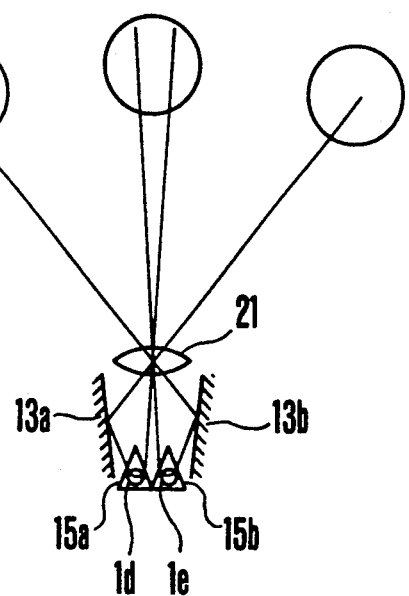

Still another distance measuring device of FIG. 17(d) is provided with light conductors 15a and 15b arranged in between the reflection mirrors 13a and 13b so that the light conductor 15a directs the light of the light-emitting element 1d to the reflection mirror 13a and therefrom to the projection lens 21, and the light conductor 15b directs the light from the light-emitting element 1e to the reflection mirror 13b and therefrom to the projection lens 21. Similar to FIG. 17(b), the two light-emitting elements 1d and 1e suffice for illuminating three objects spread in a lateral direction.

Figure 18:
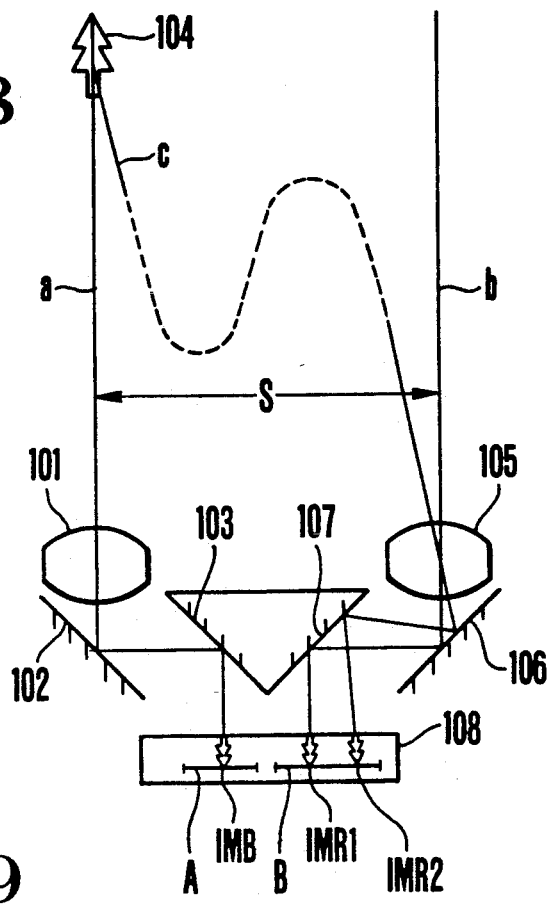
FIG. 18 is a diagram of still another embodiment of the distance measuring optical system.
Figure 19:
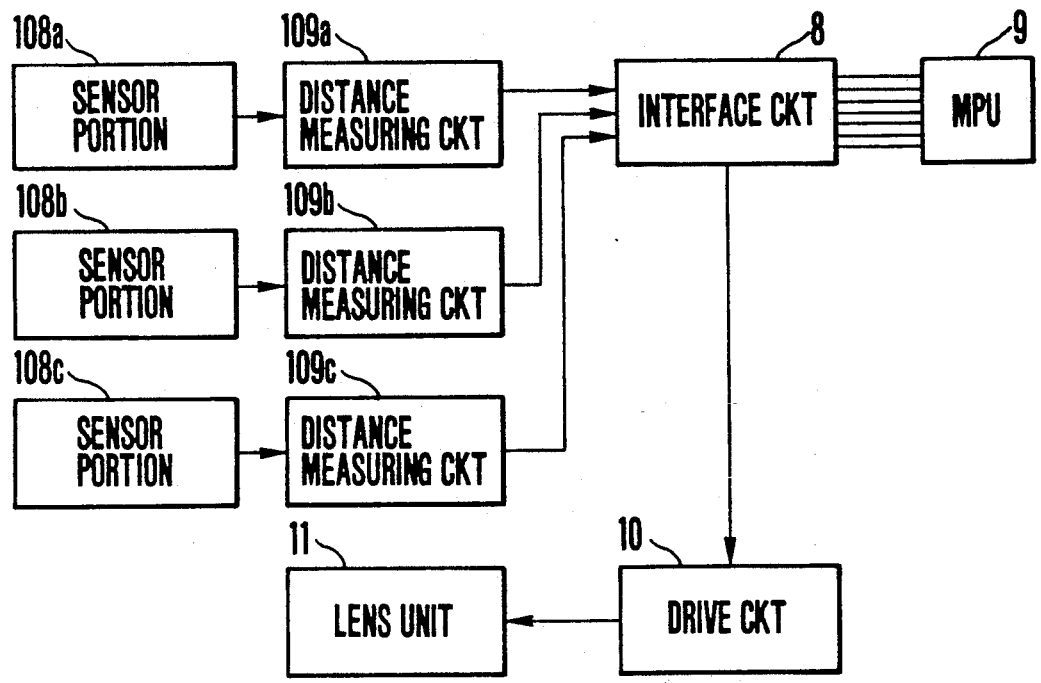
FIG. 19 is a block diagram of another automatic focusing device having the distance measuring optical system of FIG. 18.

Next, in each of the above-described embodiments, the distance measuring optical system of FIG. 1 and the automatic focusing device of FIG. 2 may be replaced by a distance measuring optical system of FIG. 18 and an automatic focusing device of FIG. 19.

The distance measuring optical system of FIG. 18 is shown as an example of the passive type called "SST". The distance measuring operation in this type of device is in principle based on the double image coincidence method, in which the correlation of two images obtained by two optical systems is examined when distance measuring information is obtained.

In FIG. 18, a collection lens 101 and mirrors 102 and 103 have a sight on an object 104 as the target for distance measurement in their common optical axis line "a". These parts constitutes an optical system called "datum side". On the other hand, another collection lens 105 and other mirrors 106 and 107 constitute an optical system called "reference side", which is arranged in spaced relation to the above-described datum side optical system by a base line length S. Light from the object 104 is collected by the lenses 101 and 105 to form images on a sensor 108. At this time, the image based on the datum side optical system is formed on a datum field A, while the image based on the reference side optical system is formed on a reference field B.

Now assuming that the object 104 is at infinity, then the object 104 comes on both the axis lines "a" and "b" of the datum and reference side optical systems, respectively. Therefore the object images, from the respective optical systems are formed on the datum and reference fields A and B as IMB and IMR₁ respectively. Meanwhile, as the object 104 approaches along the axis line "a" the optical path from the object 104 to the reference side optical system includes (see "c" in FIG. 18). For this reason, the image of the object 104 from the reference side optical system shifts to a position IMR₂ on the reference field B. As will be understood from the foregoing, by detecting what place the same image IMR as the image IMB on the datum field A takes on the reference field B, the distance to the object 104 can be measured.

FIG. 19 is a block diagram of the automatic focusing device having the distance measuring optical system of FIG. 18, where the same parts as those of FIG. 2 are denoted by the same reference characters. In FIG. 9. 108a, 108b and 108c are sensor portions constituting the above-described image sensor 108; 109a, 109b and 109c are distance measuring circuits receptive of the outputs of the above-described sensor portions 108a, 108b and 108c for computing the distance to the object 104.

In the arrangement described above, the MPU 9 reads the distance measurement results of three points in the picture frame sent from the distance measuring circuits 109a-109c through the interface circuit 8 and performs operations according to the flowchart for each of the above-described embodiments.

Also, the distance measuring optical system of FIG. 1 and the automatic focusing device of FIG. 2 may be replaced by a distance measuring optical system of FIG. 20 and an automatic focusing device of FIG. 21.

In FIG. 20, the system comprises a lens element 201, a group of, in general, 20 small lenses 202 or more for re-focusing rays of light from an image on a pupil plane of the lens element 201, and picture elements 203a, 203b, 203c and 203d of the sensor 203 in the form of CCD or the like. The arrangement is such that the picture elements 203a and 203b are related to the small lens 202-1, and the picture elements 203c and 203d are related to the small lens 202-2. The above-described picture element 203a aims at an aperture portion 204-2 through the small lens 202-1, and the picture element 203d aims at an aperture portion 204-1 through the small lens 202-2. Also, the above-described picture element 203b the aperture portion 204-1 through the small lens 202-1, and the picture element 203c at the aperture portion 204-2 through the small lens 202-2.

Here, 202-1 is assumed to be the n-the small lens, and 202-2 to be the (n-1)th one. The picture elements that aim at the aperture portions 204-2 and 204-1 through the n-th lens are labelled An and Bn, respectively. The picture elements that aim at the aperture portions 204-2 and 204-1 through the (n-1)th lens are labelled An-1 and Bn-1, respectively. A plane F represents the focal plane of the lens element 201. Therefore, when the lens element 201 changes its position to the right or left (along the optical axis), the object distance with the object image sharply focused on the plane F differs. Also, when the object image is in sharp focus, An=Bn, An-1=Bn-1, and so on result. When the object image is out of focus, on the other hand, An=Bm, An-1=Bm-1 (where m≠n) and so on result.

FIG. 21 is a block diagram of the automatic focusing device having the distance measuring optical system of FIG. 20 where the same parts as those of FIG. 2 are denoted by the same reference characters. In FIG. 21, the device includes an A/D converter 205, a gate circuit 206 for allocating the output of the A/D converter 205 to three memories 207, 208 and 209, and an interface circuit 210.

The signal obtained in the sensor 203 is converted in the A/D converter 205 to a digital signal. Then in the gate circuit 206, the picture element outputs are allocated to the three memories 207-209. This enables th three points to be measured in distance. And the contents of these three memories 207-209 are read in the MPU 9. After that, according to the flowchart of each of the above-described embodiments, the MPU 9 produces the focusing control signal. And, based on this focusing control signal, the control of the lens unit 11, in other words, the position control of the lens element 201 in the left-right direction as viewed in FIG. 20 is carried out by the drive circuit 10 that receives the above-described focusing control signal.

What is claimed is:

1. An automatic focusing device capable of measuring distances to objects corresponding to plurality of points in a picture frame, comprising:
   (A) distance measuring means for measuring the distances to the objects corresponding to the plurality of points in the picture frame to produce a plurality of distance measuring information values of said respectively plurality corresponding to points;
   (B) focusing information forming means for forming focusing information on the basis of an output of said distance measuring means; and
   (C) operation means for operating said focusing information forming means on the basis of a value obtained by factoring said distance measuring information values with exclusion of those which are farther than a distance measuring information value of a substantially central point in said picture frame into said distance measuring information value of said substantially central point to form said focusing information.

2. An automatic focusing device capable of measuring distances to objects corresponding to a plurality of points in a picture frame, comprising:
   (A) distance measuring means for measuring the distances to the objects corresponding to the plurality corresponding to points in the picture frame to produce distance measuring information values of said plurality of points;
   (B) focusing information forming means for forming focusing information on the basis of an output of said distance measuring means; and
   (C) operation means for operating and focusing information forming means on the basis of a value obtained by shifting a distance measuring information value of a substantially central point in said picture frame toward the near distance side by the distance of ½ of the difference between
      (i) one of the distance measuring information values of said plurality of points in said picture frame with exclusion of those which are farther than said distance measuring information value of said substantially central point and
      (ii) said distance measuring information value of said substantially central point to form said focusing information.

3. An automatic focusing device capable of measuring distances of objects corresponding to a plurality of points in a picture frame, comprising:
   (A) distance measuring means for measuring the distances to objects corresponding to a plurality of points in the picture frame to produce, distance measuring information values corresponding to said plurality of points;
   (B) focusing information forming means for forming focusing information on the basis of an output of said distance measuring means; and
   (C) operation means for, when, among said distance measuring information values, one average value of
      (i) an average value of a distance measuring information value of a substantially central point in the picture frame and a distance measuring information value of a marginal point and
      (ii) an average value of said distance measuring information value of said substantially central point in the picture frame and a distance measuring information value of another marginal point in the picture frame which, is indicative of a nearer distance and is above a predetermined value, operating said focusing information forming means on the basis of the average value of the nearer distance to form said focusing information.

4. An automatic focusing device capable of measuring distances of objects corresponding to a plurality of points in a picture frame, comprising:
   (A distance measuring means for measuring the distance to objects corresponding to the plurality of points in the picture frame to produce distance measuring information values corresponding to said plurality of points;
   (B) focusing information forming means for forming focusing information on the basis of an output of said distance measuring means; and
   (C) operation means for, when, among said distance measuring information values, one of
      (i) an average value of a distance measuring information value of a substantially central point in the picture frame and a distance measuring information value of a marginal point and
      (ii) an average value of said distance measuring information value of said substantially central point and a distance measuring information value of another marginal point in the picture frame, is indicative of a nearer distance and is not above a predetermined value, operating said focusing information forming means on the basis of one of said average values which is indicative of a farther distance to form said focusing information.

5. An automatic focusing device capable of measuring distances of objects corresponding to a plurality of points in a picture frame, comprising:
   (A) distance measuring means for measuring the distance to the objects corresponding to the plurality of points in the picture frame to produce distance measuring information values corresponding to said plurality of points;
   (B) focusing information forming means for forming focusing information on the basis of an output of said distance measuring means; and
   (C) operation means for, when, among said distance measuring information values, one of
      (i) a center-weighted average value of a distance measuring information value of a substantially central point in the picture frame and a distance measuring information value of a marginal point and
      (ii) a center-weighted average value of said distance measuring information value of said substantially central point and a distance measuring information value of another marginal point in the picture frame, is indicative of a nearer distance and is above a predetermined value, operating said focusing information forming means on the basis of the center-weighted average value of said nearer distance to form said focusing information.

6. An automatic focusing device capable of measuring distances of objects corresponding to a plurality of points in a picture frame, comprising:
   (A) distance measuring means for measuring the distances to the objects corresponding to the plurality of points in the picture frame to produce distance measuring information values corresponding to the plurality of points;
   (B) focusing information forming means for forming focusing information on the basis of an output of said distance measuring means; and
   (C) operation means for, when, among said distance measuring information values, one of
      (i) a center-weighted average value of a distance measuring information value of a substantially central point in the picture frame and a distance measuring information value of a marginal point and
      (ii) a center weighted average value of said distance measuring information value of said substantially central point and a distance measuring information value of another marginal point in the picture frame which, is indicative of a nearer distance and is not above a predetermined value, operating said focusing information forming means on the basis of one of said center-weighted average values which is indicative of a farther distance to form said focusing information.

7. An automatic focusing device capable of measuring distances of objects corresponding to a plurality of points in a picture frame, comprising:
   (A) distance measuring means for measuring the distances to the objects corresponding to the plurality of points in the picture frame to produce distance measuring information values corresponding to the plurality of points;
   (B) focusing information forming means for forming focusing information on the basis of an output of said distance measuring means; and
   (C) operation means for, when, among said distance measuring information values, an
      (i) average value of a distance measuring information value of a substantially central point in the picture frame and a distance measuring information value of a marginal point and
      (ii) an average value of said distance measuring information value of said substantially central point and a distance measuring information value of another marginal point in the picture frame, both lie within a predetermined range, operating said focusing information forming means on the basis of an average value of both said average values (i) and (ii) to form said focusing information.

8. An automatic focusing device capable of measuring distances of objects corresponding to a plurality of points in a picture frame, comprising:
   (A) distance measuring means for measuring the distances to the objects corresponding to the plurality of points in the picture frame to produce distance measuring information values corresponding to said plurality of points;
   (B) focusing information forming means for forming focusing information on the basis of an output of said distance measuring means; and
   (C) operation means for, when, among said distance measuring information values of said plurality of points in the picture frame,
      (i) a center-weighted average value of a distance measuring information value of a substantially central point in the picture frame and a distance measuring information value of a marginal point and
      (ii) a center-weighted average value of said distance measuring information value of said substantially central point and a distance measuring information value, of another marginal point in the picture frame, both lie within a predetermined range, operating said focusing information forming means on the basis of an average value of both said center-weighted average values (i) and (ii) to form said focusing information.

9. A focus adjustment device comprising:
   (A) distance measuring means for detecting and obtaining a distance information value for each of a plurality of objects in a picture frame by projecting a signal to each of said plural objects and receiving the signals reflected by the objects; and
   (B) processing means for forming focus adjustment information on the basis of (i) a relative positional relationship of the plurality of objects in the picture frame, said relative positional relationship being in a direction substantially parallel to the plane of the picture frame, and (ii) a relative distance relationship among said plurality of objects based on the detection results for plural objects obtained by said distance measuring means.

10. A device according to claim 9, wherein said distance means includes light projection means for projecting distance measuring light to said plurality of objects.

11. A device according to claim 10, wherein said light projection means includes a plurality of light projection means.

12. A device according to claim 11, wherein said distance measuring means includes means for causing said plurality of light projection portions to illuminate in sequence.

13. A device according to claim 9, wherein said processing means includes means for forming the focus adjustment information by giving preference to distance information corresponding to an object which is located at a relatively central position among said plurality of objects.

14. A device according to claim 13, wherein said processing means includes means for forming the focus adjustment information by giving preference to distance information corresponding to an object which is relatively near among said plurality of objects.

15. An device according to claim 9, wherein said processing means includes means for forming the focus adjustment information by giving preference to distance information corresponding to an object which is relatively near among said plurality of objects.

16. A device according to claim 9, wherein said processing means includes means for, when one of the detected distance information values of said plurality of objects in said picture frame which is indicative of a nearest distance is the distance information value of a relatively central object in said picture frame, (1) laying an emphasis on the distance information value of said relatively central object, and (2) forming the focus adjustment information in accordance with the result of that emphasis.

17. A device according to claim 9, wherein said processing means includes field depth factoring means for, when one of the distance information values of said plurality of objects in said picture frame which is indicative of the nearest distance is not the distance information value of a relatively central object in said picture frame, (1) factoring a field depth into the distance information value indicative of the nearest distance, and (2) forming the focus adjustment information in accordance with the result of that factoring.

18. A device according to claim 17, wherein, in order to factor the field depth, said field depth factoring means includes means for adding a distance corresponding to one half of aid field depth to the distance information value which is indicative of the nearest distance.

19. A device according to claim 9, wherein said processing means includes first comparison means for comparing distance information values of relatively marginal objects among said plurality of objects in said picture frame with each other.

20. A device according to claim 19, wherein said processing means includes first selection means responsive to said first comparison means for selecting one of said distance information values of said marginal objects which is indicative of the nearest distance.

21. A device according to claim 20, wherein said processing means includes second comparison means for comparing the distance information value selected by said first selection means with a predetermined distance.

22. A device according to claim 21, wherein said processing means includes second selection means for, when the distance information value compared by said second comparison means is above said predetermined distance, selecting that distance information value.

23. A device according to claim 22, wherein said processing means includes third comparison means for comparing the distance information value selected by said second selection means with the distance information value of a relatively central object in said picture frame.

24. A device according to claim 23, wherein said processing means includes means for forming the focus adjustment information on the basis of one of the distance information values compared by said third comparison means which is indicative of a relatively short distance.

25. A device according to claim 21, wherein said processing means includes second selection means for, when the distance information value compared by said second comparison means is smaller than said predetermined distance, selecting one of the distance information values of the marginal objects which has not been selected by said first selection means.

26. A device according to claim 25, wherein said processing means includes third comparison means for comparing the distance information value selected by said second selection means with the distance information value of a relatively central object in said picture frame.

27. A device according to claim 26, wherein said processing means includes means for forming the focus adjustment information on the basis of one of the distance information values compared by said third comparison means which is indicative of a relatively short distance.

28. A device according to claim 9, wherein said processing means includes selection means for, when the distance information values of the plurality of objects in the picture frame lie within a predetermined distance range, selecting all such distance information values.

29. A device according to claim 28, wherein said processing means includes discrimination means for determining whether or not one of the distance information values selected by said selection means which is indicative of the nearest distance is the distance information value of a relatively central object in said picture frame.

30. A device according to claim 29, wherein said processing means includes means for, when said discrimination means has determined that the distance information value indicative of the nearest distance is the distance information value of the relatively central object in said picture frame, forming the focus adjustment information on the basis of a central-object-weighted average value of the distance information values selected by said selecting means.

31. A device according to claim 29, wherein said processing means includes means for, when said discrimination means has determined that the distance information value indicative of the nearest distance is not the distance information value of the relatively central object in said picture frame, forming the focus adjustment information on the basis of a simple average value of the distance information values selected by said selecting means.

32. A device according to claim 9, wherein said processing means includes first discrimination means for, when one of the distance information values of said plurality of objects in said picture frame which is indicative of the nearest distance is above a predetermined distance or is the distance information value of a relatively central object in said picture frame, (1) laying an emphasis on the distance information value indicative of the nearest distance, and (2) forming the focus adjustment information in accordance with the result of that emphasis.

33. A device according to claim 32, wherein said processing means includes second discrimination means for, when the difference between predetermined ones of said distance information values of said plurality of objects in said picture frame which are respectively indicative of the nearest distance and the middle distance is not within a predetermined distance range, causing said first discrimination means to operate.

34. A device according to claim 9, wherein said processing means includes first discrimination means for, when one of the distance information values of said plurality of objects in said picture frame which is indicative of the nearest distance is above a predetermined distance or is the distance information value of a relatively central object in said picture frame, forming the focus adjustment information on the basis of only the distance information value indicative of the nearest distance.

35. A device according to claim 34, wherein said processing means includes second discrimination means for, when the difference between predetermined ones of said distance information values of said plurality of objects in said picture frame which are respectively indicative of the nearest distance and the middle distance is not within a predetermined distance range, causing said first discrimination means to operate.

36. A device according to claim 9, wherein said processing means includes first discrimination means for determining whether or not the difference between predetermined ones of said distance information values of said plurality of objects in said picture frame which are respectively indicative of the nearest distance and the middle distance lies within a predetermined distance range.

37. A device according to claim 36, wherein said processing means includes second discrimination means for determining whether or not the difference between predetermined ones of the distance information values of said plurality of objects in said picture frame which are respectively indicative of the farthest distance and the middle distance lies within a predetermined distance range.

38. A device according to claim 37, wherein said processing means includes means for, when said first discrimination means has determined that said difference lies within said predetermined distance range and said second discrimination means has determined that said difference does not lie within said predetermined distance range, forming the focus adjustment information on the basis of an average value of the distance information value indicative of the farthest distance and the distance measuring information value indicative of the middle distance.

39. A device according to claim 9, wherein said processing means includes means for, when the difference between predetermined ones of said distance information values of said plurality of objects in said picture frame the middle distance lies outside a first predetermined distance range and the distance information value indicative of the nearest distance is not below a second predetermined distance and is not the distance information value of a relatively central object in said picture frame, and when the difference between predetermined ones of said distance information values of said plurality of objects in said picture frame which are respectively indicative of the farthest distance and the middle distance lies within a third predetermined distance range, forming the focus adjustment information on the basis of an average value of the distance information value indicative of the farthest distance and the distance information value indicative of the middle distance.

40. A device according to claim 9, wherein said processing means includes means for, when the difference between predetermined ones of said distance information values of said plurality of objects in said picture frame which are respectively indicative of the nearest distance and the middle distance lies outside a first predetermined distance range and the distance information value indicative of the nearest distance is not below a second predetermined distance and is not the distance information value of a relatively central object in said picture frame, and when the difference between predetermined ones of said distance information values of said plurality of objects in said picture frame which are relatively indicative of the farthest distance and the middle distance is outside a third predetermined distance range, forming said focusing information on the basis of the distance information value indicative of the middle distance.

41. A device according to claim 9, wherein said processing means includes means for forming the focus adjustment information on the basis of all the distance information values except ones indicative to infinite distance objects in said picture frame.

42. A device according to claim 9, wherein said processing means includes discrimination means for determining whether or not one of the distance information values of said plurality of objects in said picture frame which is indicative of the farthest distance is indicative of an infinite distance.

43. A device according to claim 42, wherein said processing means includes excluding means for, when said discrimination means has determined that the distance is indicative of an infinite distance, excluding the distance information value indicative of the farthest distance to form the focus adjustment information.

44. A device according to claim 43, wherein said processing means includes means for, when all the distance information values of said plurality of objects in said picture frame lie within a predetermined distance range, causing said excluding means to operate.

45. A device according to claim 9, wherein said processing means includes means for, when one of distance information values of a relatively marginal object in said picture frame which is indicative of the nearest distance lies within a first predetermined distance range and others of the distance information values are farther then a second predetermined distance, forming the focus adjustment information on the basis of the distance information value indicative of the nearest distance.

46. A device according to claim 9, wherein said processing means includes means for, when one of the distance information values of a relatively marginal object in said picture frame which is indicative of the nearest distance lies within a first predetermined distance range and others of the distance information values are not farther than a second predetermined distance, forming the focus adjustment information on the basis of said other distance information values.

47. A device according to claim 9, wherein said processing means includes means for, when one of the distance information values of a relatively marginal object in said picture frame which is indicative of the nearest distance lies within a first predetermined distance range and others of the distance information values are not farther than a second predetermined distance, forming the focus adjustment information on the basis of one of the other distance information values which is indicative of the nearest distance.

48. A device according to claim 9, wherein said processing means includes means for, when one of the distance information values of said plurality of objects in said picture frame which is indicative to the nearest distance is the distance information value of a relatively central object in said picture frame, forming the focus adjustment information on the basis of only that distance information value.

49. A device according to claim 9, wherein said processing means includes comparison means for comparing a relative distance relationship of the plurality of objects on the basis of a positional relationship of the objects in the picture frame.

50. A device according to claim 9, wherein said processing means includes means for selecting a distance information value of an object which is at a shortest distance among said plurality of objects.

51. A device according to claim 9, wherein said processing means includes judgment means for juding whether or not the object at the nearest distance among the plurality of objects is at a relatively central position in the picture frame.

52. A device according to claim 9, wherein said processing means includes means for forming the focus adjustment information on the basis of (1) a distance information value of an object which is at a relatively central position in the picture frame among the plurality of objects, and (2) a distance information value of an object which is at a shorter distance than the central position object.

53. A device according to claim 9, wherein said processing means includes means for forming the focus adjustment information on the basis of distance information values of a plurality of relatively marginal objects among said plurality of objects when the distance information values of the relatively marginal objects are all shorter than the distance of a relatively central object and are within a predetermined range.

54. A device according to claim 9, wherein said processing means includes means for forming the focus adjustment information on the basis of a distance information value of an object which is at a relatively central position of a picture plane among the plurality of objects when distance information values of objects which are at least at one relatively marginal portion of the picture frame among the plurality of objects are shorter than the distance information value of said relatively central object and are within a predetermined range.

55. A device according to claim 9, wherein said processing means includes means for performing a weighted average computation of a central position weighting and a short distance weighting of said plurality of objects.

56. A device according to claim 9, wherein said processing means includes means for forming the focus adjustment information in accordance with a focal length of a related optical system.

57. A device according to claim 9, wherein said processing means includes means for forming the focus adjustment information in accordance with a full-open F value of a related optical system.

58. A device according to claim 9, further comprising means for driving a related optical system in response to an output of said processing means.

59. A device according to claim 9, further comprising an optical system which is driven by an output of said processing means.

60. A device according to claim 9, wherein said distance measuring means includes means for increasing an intensity of a signal projected on an object which is at a relatively central position among the plurality of objects in the picture frame to a level higher than intensities of objects which are at a relatively marginal portion in the picture frame.

61. A focus adjustment device, comprising:
(A) light receiving means for detecting signals corresponding to distance for each of a plurality of objects in a picture frame by receiving light from said plurality of objects; and
(B) processing means for forming focus adjustment information on the basis of (i) a relatively positional relation of the plurality of objects in the picture frame, said relative positional relation being in a direction substantially parallel to the plane of the picture frame, and (ii) a relative distance relation of the plurality of objects based on the detection result for plural objects detected by said light receiving means.

62. A device according to claim 61, wherein said processing means includes means for forming the focus adjustment information by giving reference to distance information corresponding to an object which is located at a relatively central position among said plurality of objects.

63. A device according to claim 62, wherein said processing means includes means for forming the focus adjustment information by giving preference to distance information corresponding to an object which is relatively near among said plurality of objects.

64. A device according to claim 61, wherein said processing means includes means for forming the focus adjustment information by giving preference to distance information corresponding to an object which is relatively near among said plurality of objects.

65. A device according to claim 61, wherein said processing means includes means for, when one of the detected distance information values of said plurality of objects in said picture frame which is indicative of a nearest distance is the distance information value of a relatively central object in said picture frame, (1) laying an emphasis on the distance information value of said relatively central object, and (2) forming the focus adjustment information in accordance with the result of that emphasis.

66. A device according to claim 61, wherein said processing means includes field depth factoring means for, when one of the distance information values of said plurality of objects in said picture frame which is indicative of the nearest distance is not the distance information values of a relatively central object in said picture frame, (1) factoring a field depth into the distance information value indicative of the nearest distance, and (2) forming the focus adjustment information in accordance with the result of that factoring.

67. A device according to claim 66, wherein, in order to factor the field depth, said field depth factoring means includes means for adding a distance corresponding to one half of said field depth to the distance information value which is indicative of the nearest distance.

68. A device according to claim 61, wherein said processing means includes fist comparison means for comparing distance information values of relatively marginal objects among said plurality of objects in said picture frame with each other.

69. A device according to claim 68, wherein said processing means includes first selection means responsive to said first comparison means for selecting one of said distance information values of said marginal objects which is indicative of the nearest distance.

70. A device according to claim 69, wherein said processing means includes second comparison means for comparing the distance information value selected by said first selection means with a predetermined distance.

71. A device according to claim 76, wherein said processing means includes second selection means for, when the distance information value compared by said second comparison means is above said predetermined distance, selecting that distance information value.

72. A device according to claim 71, wherein said processing means includes third comparison means for comparing the distance information value selected by said second selection means with the distance information value of a relatively central object in said picture frame.

73. A device according to claim 72, wherein said processing means includes means for forming the focus adjustment information on the basis of one of the distance information values compared by said third comparison means which is indicative of a relatively short distance.

74. A device according to claim 70, wherein said processing means includes second selection means for, when the distance information value compared by said second comparison means is smaller than said predetermined distance, selecting one of the distance information values of the marginal objects which has not been selected by said first selection means.

75. A device according to claim 74, wherein said processing means includes third comparison means for comparing the distance information value selected by said second selection means with the distance information value of a relatively central object in said picture frame.

76. A device according to claim 75, wherein said processing means includes means for forming the focus adjustment values compared by said third comparison means which is indicative of a relatively short distance.

77. A device according to claim 61, wherein said processing means includes selection means for, when the distance information values of the plurality of objects in the picture frame lie within a predetermined distance range, selecting all such distance information values.

78. A device according to claim 77, wherein said processing includes discrimination means for determining whether or not one of the distance information values selected by said selection means which is indicative of the nearest distance is the distance information value of a relatively central object in said picture means.

79. A device according to claim 78, wherein said processing means includes means for, when said discrimination means has determined that the distance information value indicative of the nearest distance is the distance information value of the relatively central object in said picture frame, forming the focus adjustment information on the basis of a central-object-weighted average value of the distance information values selected by said selecting means.

80. A device according to claim 78, wherein said processing means includes means for, when said discrimination means has determined that the distance information value indicative of the nearest distance is not the distance information value of the relatively central object in said picture frame, forming the focus adjustment information on the basis of a simple average value of the distance information values selected by said selecting means.

81. A device according to claim 61, wherein said processing means includes first discrimination means for, when one of the distance information values of said plurality of objects in said picture frame which is indicative of the nearest distance is above a predetermined distance or is the distance information value of a relatively central object in said picture frame, (1) laying an emphasis on the distance information value indicative of the nearest distance, and (2) forming the focus adjustment information in accordance with the result of that emphasis.

82. A device according to claim 81, wherein said processing means includes second discrimination means for, when the difference between predetermined ones of said distance information values of said plurality of objects in said picture frame which are respectively indicative of the nearest distance and the middle distance is not within a predetermined distance range, causing said first discrimination means to operate.

83. A device according to claim 61, wherein said processing means includes first discrimination means for, when one of the distance information values of said plurality of objects in said picture frame which is indicative of the nearest distance is above a predetermined distance or is the distance information value of a relatively central object in said picture frame, forming the focus adjustment information on the basis of only the distance information value indicative of the nearest distance.

84. A device according to claim 83, wherein said processing means includes second discrimination means for, when the difference between predetermined ones of said distance information values of said plurality of objects in said picture frame which are respectively indicative of the nearest distance and the middle distance is not within a predetermined distance range, causing said first discrimination means to operate.

85. A device according to claim 61, wherein said processing means includes first discrimination means for determining whether or not the difference between predetermined ones of said distance information values of said plurality of objects in said picture frame which are respectively indicative of the nearest distance and the middle distance lies within a predetermined distance range.

86. A device according to claim 85, wherein said processing means includes second discrimination means for determining whether or not the difference between predetermined ones of the distance information values of said plurality of objects in said picture frame which are respectively indicative of the farthest distance and the middle distance lies within a predetermined distance range.

87. A device according to claim 86, wherein said processing means includes means for, when said first discrimination means has determined that said difference lies within said predetermined distance range and said second discrimination means has determined that said difference does not lie within said predetermined distance range, forming the focus adjustment information on the basis of an average value of the distance information value indicative of the farthest distance and the distance measuring information value indicative of the middle distance.

88. A device according to claim 61, wherein said processing means includes means for, when the difference between predetermined ones of said distance information values of said plurality of objects in said picture frame which are respectively indicative of the nearest distance and the middle distance lies outside a first predetermined distance range and the distance information value indicative of the nearest distance is not below a second predetermined distance and is not the distance information value of a relatively central object in said picture frame, and when the difference between predetermined ones of said distance information values of said plurality of objects in said picture frame which are respectively indicative of the farthest distance and the middle distance lies within a third predetermined distance range, forming the focus adjustment information on the basis of an average value of the distance information value indicative of the farthest distance and the distance information value indicative of the middle distance.

89. A device according to claim 61, wherein said processing means includes means for, when the difference between predetermined ones of said distance information values of said plurality of objects in said picture frame which are respectively indicative of the nearest distance and the middle distance lies outside a first predetermined distance range and the distance information value indicative of the nearest distance is not below a second predetermined distance and is not the distance information value of a relatively central object in said picture frame, and when the difference between predetermined ones of said distance information values of said plurality of objects in said picture frame which are respectively indicative of the farthest distance and the middle distance is outside a third predetermined distance range, forming said focusing information on the basis of the middle distance.

90. A device according to claim 61, wherein said processing means includes means for forming the focus adjustment information on the basis of all the distance information values except ones indicative of an infinite distance objects in said picture frame.

91. A device according to claim 61, wherein said processing means includes discrimination means for determining whether or not one of the distance information values of said plurality of objects in said picture frame which is indicative of the furthest distance is indicative of an infinite distance.

92. A device according to claim 91, wherein said processing means includes excluding means for, when said discrimination means has determined that the distance information value indicative of the farthest distance is indicative of an infinite distance, excluding the distance information value indicative of the farthest distance to form the focus adjustment information.

93. A device according to claim 92, wherein said processing means includes means for, when all the distance information values of said plurality of objects in said picture frame lie within a predetermined distance range, causing said excluding means to operate.

94. A device according to claim 61, wherein processing means includes means for, when one of distance information values of a relatively marginal object in said picture frame which is indicative of the nearest distance lies within a first predetermined distance range and others of the distance information values are farther than a second predetermined distance, forming the focus adjustment information on the basis of the distance information value indicative of the nearest distance.

95. A device according to claim 61, wherein said processing means includes means for, when one of the distance information values of relatively marginal object in said picture frame which is indicative of the nearest distance lies within a first predetermined distance range and others of the distance information values are not farther than a second predetermined distance, forming the focus adjustment information on the basis of said other distance information values.

96. A device according to claim 61, wherein said processing means includes means for, when one of the distance information values of a relatively marginal objects in said picture frame which is indicative of the nearest distance lies within a first predetermined distance range and others of the distance information values are not farther than a second predetermined distance, forming the focus adjustment information on the basis of one of the other distance information values which is indicative of the nearest distance.

97. A device according to claim 61, wherein said processing means includes means for, when one of the distance information values of said plurality of objects in said picture frame which is indicative of the nearest distance is the distance information value of a relatively central object in said picture frame, forming the focus adjustment information on the basis of only that distance information value.

98. A device according to claim 61, wherein said processing means includes comparison means for comparing a relative distance relationship of the plurality of objects on the basis of a positional relationship of the objects in the picture frame.

99. A device according to claim 61, wherein said processing means includes means for selecting a distance information value of an object which is at a shortest distance among said plurality of objects.

100. A device according to claim 61, wherein said processing means includes judgment means for juding whether or not the object at the nearest distance among the plurality of objects is at a relatively central position in the picture frame.

101. A device according to claim 61, wherein said processing means includes means for forming the focus adjustment information on the basis of (1) a distance information value of an object which is at a relatively central position in the picture frame among the plurality of objects, and (2) a distance information value of an object which is at a shorter distance than the central position object.

102. A device according to claim 61, wherein said processing means includes means for forming the focus adjustment information on the basis of distance information values of a plurality of relatively marginal objects among said plurality of objects when the distance information values of the relatively marginal objects are all shorter than the distance of a relatively central object and are within a predetermined range.

103. A device according to claim 61, wherein said processing means includes means for forming the focus adjustment information on the basis of a distance information value of an object which is at a relatively central position of a picture plane among the plurality of objects when distance information values of objects which are at least at one relatively marginal portion of the picture frame among the plurality of objects are shorter then the distance information value of said relatively central object and are within a predetermined range.

104. A device according to claim 61, wherein said processing means includes means for performing a weighted average computation of a central position weighting and a short distance weighting of said plurality of objects.

105. A device according to claim 61, wherein said processing means includes means for forming the focus adjustment information in accordance with a focal length of a related optical system.

106. A device according to claim 61, wherein said processing means includes means for forming the focus adjustment information in accordance with a full-open F value of a related optical system.

107. A device according to claim 61, further comprising means for driving a related optical system in response to an output of said process means.

108. A device according to claim 61, further comprising an optical system which is driven by an output of said processing means.

109. A device according to claim 61, wherein said distance measuring means includes means for increasing an intensity of a signal projected on an object which is at a relatively central position among the plurality of objects in the picture frame to a level higher than intensities of objects which are at a relatively marginal portion in the picture frame.

110. A camera comprising:
(A) distance measuring means for detecting and obtaining a distance information value for each of plural objects in a picture frame by projecting a signal to each of said plural objects and receiving the signals reflected by the objects; and
(B) processing means for forming focus adjustment information on the basis of (i) a relative positional relationship among said plurality of objects in the picture frame, said relative positional relationship being in a direction substantially parallel to the plane of the picture frame, and (ii) a relative distance relationship of the plurality of objects based on the detection results for plural objects obtained by said distance measuring means.

111. A camera according to claim 110, wherein said distance measuring means includes light projection means for projecting distance measuring light to said plurality of objects.

112. A camera according to claim 111, wherein said light projection means includes a plurality of light projection portions.

113. A camera according to claim 112, wherein said distance measuring means includes means for causing said plurality of light projection portions to illuminate in sequence.

114. A camera according to claim 110, wherein said processing means includes means for forming the focus adjustment information by giving preference to distance information corresponding to an object which is located at a relatively central position among said plurality of objects.

115. A camera according to claim 114, wherein said processing means includes means for forming the focus adjustment information by giving preference to distance information corresponding to an object which is relatively near among said plurality of objects.

116. A camera according to claim 110, wherein said processing means includes means for forming the focus adjustment information by giving preference to distance information corresponding to an object which is relatively near among said plurality of objects.

117. A camera according to claim 110, wherein said processing means includes means for, when one of the detected distance information values of said plurality of objects in said picture frame which is indicative of a nearest distance is the distance information value of a relatively central object in said picture frame, (1) laying an emphasis on the distance information value of said relatively central object, and (2) forming the focus adjustment information in accordance with the result of that emphasis.

118. A camera according to claim 110, wherein said processing means includes field depth factoring means for, when one of the distance information values of said plurality of objects in said picture frame which is indicative of the nearest distance is not the distance information value of a relatively central object in said picture frame, (1) factoring a field depth into the distance information value indicative of the nearest distance, and (2) forming the focus adjustment information in accordance with the result of that factoring.

119. A camera according to claim 118, wherein, in order to factor the field depth, said field depth factoring means includes means for adding a distance corresponding to one half of said field depth to the distance information value which is indicative of the nearest distance.

120. A camera according to claim 110, wherein said processing means includes first comparison means for comparing distance information values of relatively marginal objects among said plurality of objects in said picture frame with each other.

121. A camera according to claim 120, wherein said processing means includes first selection means responsive to said first comparison means for selecting one of said distance information values of said marginal objects which is indicative of the nearest distance.

122. A camera according to claim 121, wherein said processing means includes second comparison means for comparing the distance information value selected by said first selection means with a predetermined distance.

123. A camera according to claim 122, wherein said process means includes second selection means for, when the distance information value compared by said second comparison means is above said predetermined distance, selecting that distance information value.

124. A camera according to claim 123, wherein said processing means includes third comparison means for comparing the distance information value selected by said second selection means with the distance information value of a relatively central object in said picture frame.

125. A camera according to claim 124, wherein said processing means includes means for forming the focus adjustment information on the basis of one of the distance information values compared by said third comparison means which is indicative of a relatively short distance.

126. A camera according to claim 122, wherein said processing means includes second selection means for, when the distance information value compared by said second comparison means is smaller than said predetermined distance, selecting one of the distance information values of the marginal objects which has not been selected by said first selection means.

127. A camera according to claim 126, wherein said processing means includes third comparison means for comparing the distance information value selected by said second selection means with the distance information value of a relatively central object in said picture frame.

128. A camera according to claim 127, wherein said processing means includes means for forming the focus adjustment information on the basis of one of the distance information values compared by said third comparison means which is indicative of a relatively short distance.

129. A camera according to claim 110, wherein said processing means includes selection means for, when the distance information values of the plurality of objects in the picture frame lie within a predetermined distance range, selecting all such distance information values.

130. A camera according to claim 129, wherein said processing means includes discrimination means for determining whether or not one of the distance information values selected by said selection means which is indicative of the nearest distance is the distance information value of a relatively central object in said picture frame.

131. A camera according to claim 130, wherein said processing means includes means for, when said discrimination means has determined that the distance information value indicative of the nearest distance is the distance information value of the relatively central object in said picture frame, forming the focus adjustment information on the basis of a central-object-weighted average value of the distance information values selected by said selecting means.

132. A camera according to claim 130, wherein said processing means includes means for, when said discrimination means has determined that the distance information value indicative of the nearest distance is not the distance information value of the relatively central object in said picture frame, forming the focus adjustment information on the basis of a simple average value of the distance information values selected by said selecting means.

133. A camera according to claim 110, wherein said processing means includes first discrimination means for, when one of the distance information values of said plurality of objects in said picture frame which is indicative of the nearest distance is above a predetermined distance or is the distance information value of a relatively central object in said picture frame, (1) laying an emphasis on the distance information value indicative of the nearest distance, and (2) forming the focus adjustment information in accordance with the result of that emphasis.

134. A camera according to claim 133, wherein said processing means includes second discrimination means for, when the difference between predetermined ones of said distance information values of said plurality of objects in said picture frame which are respectively indicative of the nearest distance and the middle distance is not within a predetermined distance range, causing said first discrimination means to operate.

135. A camera according to claim 110, wherein said processing means includes first discrimination means for, when one of the distance information values of said plurality of objects in said picture frame which is indicative of the nearest distance is above a predetermined distance or is the distance information value of a relatively central object in said picture frame, forming the focus adjustment information on the basis of only the distance information value indicative of the nearest distance.

136. A camera according to claim 135, wherein said processing means includes second discrimination means for, when the difference between predetermined ones of said distance information values of said plurality of objects in said picture frame which are respectively indicative of the nearest distance and the middle distance is not within a predetermined distance range, causing said first discrimination means to operate.

137. A camera according to claim 110, wherein said processing means includes first discrimination means for determining whether or not the difference between predetermined ones of said distance information values of said plurality of objects in said picture frame which are respectively indicative of the nearest distance and the middle distance lies within a predetermined distance range.

138. A camera according to claim 137, wherein said processing means includes second discrimination means for determining whether or not the difference between predetermined ones of the distance information values of said plurality of objects in said picture frame which are respectively indicative of the farthest distance and the middle distance lies within a predetermined distance range.

139. A camera according to claim 138, wherein said processing means includes means for, when said first discrimination means has determined that said difference lies within said predetermined distance range and said second discrimination means has determined that said difference does not lie within said predetermined distance range, forming the focus adjustment information on the basis of an average value of the distance information value indicative of the farthest distance and the distance measuring information value indicative of the middle distance.

140. A camera according to claim 110, wherein said processing means includes means for, when the difference between predetermined ones of said distance information values of said plurality of objects in said picture frame which are respectively indicative of the nearest distance and the middle distance lies outside a first predetermined distance range and the distance information value indicative of the nearest distance is not below a second predetermined distance and is not the distance information value of a relatively central object in said picture frame, and when the difference between predetermined ones of said distance information values of said plurality of objects in said picture frame which are respectively indicative of the farthest distance and the middle distance lies within a third predetermined distance range, forming the focus adjustment information on the basis of an average value of the distance information value indicative of the farthest distance and the distance information value indicative of the middle distance.

141. A camera according to claim 110, wherein said processing means includes means for, when the difference between predetermined ones of said distance information values of said plurality of objects in said picture frame which are relatively indicative of the nearest distance and the middle distance lies outside a first predetermined distance range and the distance information value indicative of the nearest distance is not below a second predetermined distance and is not the distance information value of a relatively central object in said picture frame, and when the difference between predetermined ones of said distance information values of said plurality of objects in said picture frame which are respectively indicative of the farthest distance and the middle distance is outside a third predetermined distance range, forming said focusing information on the basis of the distance information value indicative of the middle distance.

142. A camera according to claim 110, wherein said processing means includes means for forming the focus adjustment information on the basis of all the distance information values except ones indicative of infinite distance objects in said picture frame.

143. A camera according to claim 110, wherein said processing means includes discrimination means for determining whether or not one of the distance information values of said plurality of objects in said picture frame which is indicative of the farthest distance is indicative of an infinite distance.

144. A camera according to claim 143, wherein said processing means includes excluding means for, when said discrimination means has determined that the distance information value indicative of the farthest distance is indicative of an infinite distance, excluding the distance information value indicative of the farthest distance to from the focus adjustment information.

145. A camera according to claim 144, wherein said processing means includes means for, when all the distance information values of said plurality of objects in said picture frame lie within a predetermined distance range, causing said excluding means to operate.

146. A camera according to claim 110, wherein said processing means includes means for, when one of distance information values of a relatively marginal object in said picture frame which is indicative of the nearest distance lies within a first predetermined distance range and others of the distance information values are farther than a second predetermined distance, forming the focus adjustment information on the basis of the distance information value indicative of the nearest distance.

147. A camera according to claim 110, wherein said processing means includes means for, when one of the distance information values of a relatively marginal object in said picture frame which is indicative of the nearest distance lies within a first predetermined distance range and others of the distance information values are not farther than a second predetermined distance, forming the focus adjustment information on the basis of said other distance information values.

148. A camera according to claim 110, wherein said processing means includes means for, when one of the distance information values of a relatively marginal objects in said picture frame which is indicative of the nearest distance lies within a first predetermined distance range and others of the distance information values are not farther than a second predetermined distance, forming the focus adjustment information on the basis of one of the other distance information values which is indicative of the nearest distance.

149. A camera according to claim 110, wherein said processing means includes means for, when one of the distance information values of said plurality of objects in said picture frame which is indicative of the nearest distance is the distance information value of a relatively central object in said picture frame, forming the focus adjustment information on the basis of only that distance information value.

150. A camera according to claim 110, wherein said processing means includes comparison means for comparing a relative distance relationship of the plurality of objects on the basis of a positional relationship of the objects in the picture frame.

151. A camera according to claim 110, wherein said processing means includes means for selecting a distance information value of an object which is at a shortest distance among said plurality of objects.

152. A camera according to claim 110, wherein said processing means includes judgment means for judging whether or not the object at the nearest distance among the plurality of objects is at a relatively central position in the picture frame.

153. A camera according to claim 110, wherein said processing means includes means for forming the focus adjustment information on the basis of (1) a distance information value of an object which is at a relatively central position in the picture frame among the plurality of objects, and (2) a distance information value of an object which is at a shorter distance than the central position object.

154. A camera according to claim 110, wherein said processing means includes means for forming the focus adjustment information on the basis of distance information values of the relatively marginal objects among said plurality of objects when the distance information values of the relatively marginal objects are all shorter than the distance of a relatively central object and are within a predetermined range.

155. A camera according to claim 110, wherein said processing means includes means for forming the focus adjustment information on the basis of a distance information value of an object which is at a relatively central position of a picture plane among the plurality of objects when distance information values of objects which are at least at one relatively marginal portion of the picture frame among the plurality of objects are shorter than the distance information value of said relatively central object and are within a predetermined range.

156. A camera according to claim 110, wherein said processing means includes means for performing a weighted average computation of a central position weighting and a short distance weighting of said plurality of objects.

157. A camera according to claim 110, wherein said processing means includes means for forming the focus adjustment information in accordance with a focal length of a related optical system.

158. A camera according to claim 110, wherein said processing means includes means for forming the focus adjustment information in accordance with a full-open F value of a related optical system.

159. A camera according to claim 110, wherein said comprising means for deriving a related optical system in response to an output of said processing means.

160. A camera according to claim 110, wherein said comprising an optical system which is driven by an output of said processing means.

161. A camera according to claim 110, wherein said distance measuring means includes means for increasing an intensity of a signal projected on an object which is at a relatively central position among the plurality of objects in the picture frame to a level higher than intensities of objects which are at a relatively marginal portion in the picture frame.

162. A camera, comprising:
 (A) light receiving means for detecting and obtaining signals corresponding to distances for each of a plurality of objects in a picture frame by receiving light from said plurality of objects; and
 (B) processing means for forming focus adjustment information on the basis of (i) a positional relation of the plurality of objects in the picture frame, said relative positional relationship being in a direction substantially parallel to the plane of the picture frame, and (ii) a relative distance relation of the plurality of objects based on the detection result for plural objects detected by said light receiving means.

163. A device according to claim 162, wherein said processing means includes means for forming the focus adjustment information by giving preference to distance information corresponding to an object which is located at a relatively central position among said plurality of objects.

164. A device according to claim 163, wherein said processing means includes means for forming the focus adjustment information by giving preference to distance information corresponding to an object which is relatively near among said plurality of objects.

165. A device according to claim 162, wherein said processing means includes means for forming the focus adjustment information by giving preference to distance information corresponding to an object which is relatively near among said plurality of objects.

166. A device according to claim 162, wherein said processing means includes means for, when one of the detected distance information values of said plurality of objects in said picture frame which is indicative of a nearest distance is the distance information value of a relatively central object in said picture frame, (1) laying an emphasis on the distance information value of said relatively central object, and (2) forming the focus adjustment information in accordance with the result of that emphasis.

167. A device according to claim 162, wherein said processing means includes field depth factoring means for, when one of the distance information values of said plurality of objects in said picture frame which is indicative of the nearest distance is not the distance information value of the relatively central object in said picture frame, (1) factoring a field depth into the distance information value indicative of the nearest distance, and (2) forming the focus adjustment information in accordance with the result of that factoring.

168. A device according to claim 167, wherein said order to factor the field depth, said field depth factoring means includes means for adding a distance corresponding to one half of said field depth to the distance information value which is indicative of the nearest distance.

169. A device according to claim 162, wherein said processing means includes first comparison means for comparing distance information values of relatively marginal objects among said plurality of objects in said picture frame with each other.

170. A device according to claim 169, wherein said processing means includes first selection means responsive to said first comparison means for selecting one of said distance information values of said marginal objects which is indicative of the nearest distance.

171. A device according to claim 170, wherein said processing means includes second comparison means for comparing the distance information value selected by said first selection means with a predetermined distance.

172. A device according to claim 171, wherein said processing means includes second selection means for, when the distance information value compared by said second comparison means is above said predetermined distance, selecting that distance information value.

173. A device according to claim 172, wherein said processing means includes third comparison means for comparing the distance information value selected by said second selection means with the distance information value of a relatively central object in said picture frame.

174. A device according to claim 173, wherein said processing means includes means for forming the focus adjustment information on the basis of one of the distance information values compared by said third comparison means which is indicative of a relatively short distance.

175. A device according to claim 171, wherein said processing means includes second selection means for, when the distance information value compared by said second comparison means is smaller than said predetermined distance, selecting one of the distance information values of the marginal objects which has not been selected by said first selection means.

176. A device according to claim 175, wherein said processing means includes third comparison means for comparing the distance information value selected by said second selection means with the distance information value of a relatively central object in said picture frame.

177. A device according to claim 176, wherein said processing means include means for forming the focus adjustment information on the basis of one of the distance information values compared by said third comparison means which is indicative of a relatively short distance.

178. A device according to claim 162, wherein said processing means includes selection means for, when the distance information values of the plurality of objects in the picture frame lie within a predetermined distance range, selecting all such distance information values.

179. A device according to claim 178, wherein said processing means includes discrimination means for determining whether or not one of the distance information values selected by said selection means which is indicative of the nearest distance is the distance information value of a relatively central object in said picture frame.

180. A device according to claim 179, wherein said processing means includes means for, when said discrimination means has determined that the distance information value indicative of the nearest distance is the distance information value of the relatively central object in said picture frame, forming the focus adjustment information on the basis of a central-object-weighted average value of the distance information values selected by said selecting means.

181. A device according to claim 179, wherein said processing means includes means for, when said discrimination means has determined that the distance information value indicative of the nearest distance is not the distance information value of the relatively central object in said picture frame, forming the focus adjustment information on the basis of a simple average value of the distance information values selected by said selecting means.

182. A device according to claim 162, wherein said processing means includes first discrimination means for, when one of the distance information values of said plurality of objects in said picture frame which is indicative of the nearest distance is above a predetermined distance or is the distance information value of a relatively central object in said picture frame, (1) laying an emphasis on the distance information value indicative of the nearest distance, and (2) forming the focus adjustment information in accordance with the result of that emphasis.

183. A device according to claim 182, wherein said processing means includes second discrimination means for, when the difference between predetermined ones of said distance information values of said plurality of objects in said picture frame which are respectively indicative of the nearest distance and the middle distance is not within a predetermined distance range, causing said first discrimination means to operate.

184. A device according to claim 162, wherein said processing means includes first discrimination means for, when one of the distance information values of said plurality of objects in said picture frame which is indicative of the nearest distance is above a predetermined distance or is the distance information value of a relatively central object in said picture frame, forming the focus adjustment information on the basis of only the distance information value indicative of the nearest distance.

185. A device according to claim 184, wherein said processing means includes second discrimination means for, when the difference between predetermined ones of said distance information values of said plurality of objects in said picture frame which are respectively indicative of the nearest distance and the middle distance is not within a predetermined distance range, causing said first discrimination means to operate.

186. A device according to claim 162, wherein said processing means includes first discrimination means for determining whether or not the difference between predetermined ones of said distance information values of said plurality of objects in said picture frame which are respectively indicative of the nearest distance and the middle distance lies within a predetermined distance range.

187. A device according to claim 186, wherein said processing means includes second discrimination means for determining whether or not the difference between predetermined ones of the distance information values of said plurality of objects in said picture frame which are respectively indicative of the farthest distance and the middle distance lies within a predetermined distance range.

188. A device according to claim 187, wherein said processing means includes means for, when said first discrimination means has determined that said difference lies within said predetermined distance range and said second discrimination means has determined that said difference does not lie within said predetermined distance range, forming the focus adjustment information on the basis of an average value of the distance information value indicative of the farthest distance and the distance measuring information value indicative of the middle distance.

189. A device according to claim 162, wherein said processing means includes means for, when the difference between predetermined ones of said distance information values of said plurality of objects in said picture frame which are respectively indicative of the nearest distance and the middle distance lies outside a first predetermined distance range and the distance information value indicative of the nearest distance is not below a second predetermined distance and is not the distance information value of a relatively central object in said picture frame, and when the difference between predetermined ones of said distance information values of said plurality of objects in said picture frame which are respectively indicative of the farthest distance and the middle distance lies within a third predetermined distance range, forming the focus adjustment information on the basis of an average value of the distance information value indicative of the farthest distance and the distance information value indicative of the middle distance.

190. A device according to claim 162, wherein said processing means includes means for, when the difference between predetermined ones of said distance information values of said plurality of objects in said picture frame which are respectively indicative of the nearest distance and the middle distance lies outside a first predetermined distance range and the distance information value indicative of the nearest distance is not below a second predetermined distance and is not the distance information value of a relatively central object in said picture frame, and when the difference between predetermined ones of said distance information values of said plurality of objects in said picture frame which are respectively indicative of the farthest distance and the middle distance is outside a third predetermined distance range, forming said focusing information on the basis of the distance information value indicative of the middle distance.

191. A device according to claim 162, wherein said processing means includes means for forming the focus adjustment information on the basis of all the distance information values except ones indicative of infinite distance objects in said picture frame.

192. A device according to claim 162, wherein said processing means includes discrimination means for determining whether or not one of the distance information values of said plurality of objects in said picture frame which is indicative of the farthest distance is indicative of an infinite distance.

193. A device according to claim 192, wherein said processing means includes excluding means for, when said discrimination means has determined that the distance information value indicative of the farthest distance is indicative of an infinite distance, excluding the distance information value indicative of the farthest distance to form the focus adjustment information.

194. A device according to claim 193, wherein said processing means includes means for, when all the distance information values of said plurality of objects in said picture frame lie within a predetermined distance range, causing said excluding means to operate.

195. A device according to claim 162, wherein said processing means includes means for, when one of distance information values of a relatively marginal object in said picture frame which is indicative of the nearest distance lies within a first predetermined distance range and others of the distance information values are farther than a second predetermined distance, forming the focus adjustment information on the basis of the distance information value indicative of the nearest distance.

196. A device according to claim 162, wherein said processing means includes means for, when one of the distance information values of a relatively marginal object in said picture frame which is indicative of the nearest distance lies within a first predetermined distance range and others of the distance information values are not farther than a second predetermined distance, forming the focus adjustment information on the basis of said other distance information values.

197. A device according to claim 162, wherein said processing means includes means for, when one of the distance information values of a relatively marginal objects in said picture frame which is indicative of the nearest distance lies within a first predetermined distance range and others of the distance information values are not farther than a second predetermined distance, forming the focus adjustment information on the basis of one of the other distance information values which is indicative of the nearest distance.

198. A device according to claim 162, wherein said processing means includes means for, when one of the distance information values of said plurality of objects in said picture frame which is indicative of the nearest distance is the distance information value of a relatively central object in said picture frame, forming the focus adjustment information on the basis of only that distance information value.

199. A device according to claim 162, wherein said processing means includes comparison means for comparing a relatively distance relationship of the plurality of objects on the basis of a positional relationship of the objects in the picture frame.

200. A device according to claim 162, wherein said processing means includes means for selecting a distance information value of an object which is at a shortest distance among said plurality of objects.

201. A device according to claim 162, wherein said processing means includes judgment means for judging whether or not the object at the nearest distance among the plurality of objects is at a relatively central position in the picture frame.

202. A device according to claim 162, wherein said processing means includes means for forming the focus adjustment information on the basis of (1) a distance information value of an object which is at a relatively central position in the picture frame among the plurality of objects, and (2) a distance information value of an object which is at a shorter distance than the central position object.

203. A device according to claim 162, wherein said processing means includes means for forming the focus adjustment information on the basis of distance information values of a plurality of relatively marginal objects among said plurality of objects when the distance information values of the relatively marginal objects are all shorter than the distance of a relatively central object and are within a predetermined range.

204. A device according to claim 162, wherein said processing means includes means for forming the focus adjustment information on the basis of a distance information value of an object which is at a relatively central position of a picture plane among the plurality of objects when distance information values of objects which are at least one relatively marginal portion of the picture frame among the plurality of objects are shorter than the distance information value of said relatively central object and are within a predetermined range.

205. A device according to claim 162, wherein said processing means includes means for performing a weighted average computation of a central position weighting and a short distance weighting of said plurality of objects.

206. A device according to claim 162, wherein said processing means includes means for forming the focus adjustment information in accordance with a focal length of a related optical system.

207. A device according to claim 162, wherein said processing means includes means for forming the focus adjustment information in accordance with a full-open F value of a related optical system.

208. A device according to claim 162, further comprising means for driving a related optical system in response to an output of said processing means.

209. A device according to claim 162, further comprising an optical system which is drive by an output of said processing means.

210. A device according to claim 162, wherein said distance measuring means includes means for increasing an intensity of a signal projected on an object which is at a relatively central position among the plurality of objects in the picture frame to a level higher than intensities of objects which are at a relatively marginal portion in the picture frame.

* * * * *

UNITED STATES PATENT AND TRADEMARK OFFICE
CERTIFICATE OF CORRECTION

PATENT NO. : 5,313,245
DATED : May 17, 1994
INVENTOR(S) : KAZUKI KONISHI

It is certified that error appears in the above-indentified patent and that said Letters Patent is hereby corrected as shown below:

COLUMN 1

Line 29, "mainly" should read --(mainly--.
    Line 40, "and;)" should read --and 61-55618.);--.
    Line 51, "outdoor" should read --outdoor)--.
    Line 58, "to" should read --to the--.
    Line 68, "of" should read --of the--, and "to the" should read --to--.

COLUMN 2

Line 14, "depth" should read --depth is--.
    Line 21, "an" should read --a--.
    Line 31, "This," should read --Thus,--.
    Line 36, "as" should read --(as--.
    Line 60, "of" should read --of the--, and "of the" should read --of--.

COLUMN 4

Line 12, "to of" should read --to--.
    Line 26, "in" should read --at--.
    Line 65, "in" should read --in the--.

COLUMN 5

Line 46, "which" should read --which corresponds--.
    Line 55, "marginal nearest" should read --marginal-nearest--.

UNITED STATES PATENT AND TRADEMARK OFFICE
CERTIFICATE OF CORRECTION

PATENT NO. : 5,313,245
DATED : May 17, 1994
INVENTOR(S) : KAZUKI KONISHI

It is certified that error appears in the above-indentified patent and that said Letters Patent is hereby corrected as shown below:

COLUMN 6

Line 21, "result L(3)" should read --result L(3),--, and "LN = L(3)," should read --LN = L(3)--.
Line 32, "shot" should read --shot.--.

COLUMN 9

Line 11, "$|LM-LF| < k$" should read --$|LM-LF| \leq k$--.
Line 17, "$|LM-LF| < k$" should read --$|LM-LF| \leq k$--.
Line 23, "hand" should read --hand,--.
Line 37, "condi-" should be deleted.
Line 38, line 38 should be deleted in its entirety.
Line 39, "the is" should read --the conditions (I) and (II) is--.
Line 41, "condi-" should be deleted.
Line 42, line 42 should be deleted in its entirety.

COLUMN 11

Line 10, "point LN." should read --point LN,--.
Line 17, "$|LM-LF|)$" should read --$|LN-LM|)$--.
Line 37, "an-d" should read --and--.
Line 64, "there-is" should read --there is--.

COLUMN 12

Line 10, "$|LM-LF| > k),$" should read --$|LN-LM| > k),$--.
Line 40, "$|LM-LF| > k),$" should read --$|LN-LM| > k),$--.
Line 47, "$|LM-LF| \leq k),$" should read --$|LN-LM| \leq k)$--.
Line 68, "$|LM-LF| > k)$" should read --$|LN-LM| > k)$, and "explained" should read --explained.--.

UNITED STATES PATENT AND TRADEMARK OFFICE
CERTIFICATE OF CORRECTION

PATENT NO. : 5,313,245
DATED : May 17, 1994
INVENTOR(S) : KAZUKI KONISHI

It is certified that error appears in the above-indentified patent and that said Letters Patent is hereby corrected as shown below:

COLUMN 13

Line 36, "to he" should read --the--.
    Line 65, "the" should read --The--.

COLUMN 15

Line 46, "1.8 m," should read --for 1.8 m,--.
    Line 47, "2 m, and" should read --2 m, they are ±50 cm and--.
    Line 53, "shorter than this distance," should read --distance shorter than this,--.

COLUMN 16

Line 26, "3-teeth," should read --3 teeth,--.

COLUMN 17

Line 5, "or" should read --of--.

COLUMN 19

Line 16, "of" should be deleted.

UNITED STATES PATENT AND TRADEMARK OFFICE
CERTIFICATE OF CORRECTION

PATENT NO. : 5,313,245
DATED : May 17, 1994
INVENTOR(S) : KAZUKI KONISHI

It is certified that error appears in the above-indentified patent and that said Letters Patent is hereby corrected as shown below:

COLUMN 23

Line 2, "le" should read --1e--.
    Line 3, "le" should read --1e--.
    Line 14, "le" should read --1e--.
    Line 17, "le" should read --1e--.
    Line 35, "le" should read --1e--.
    Line 52, "constitutes" should read --constitute--.
    Line 66, "images," should read --images--.

COLUMN 24

Line 42, "element 203b" should read --element 203b aims at--.
    Line 44, "element 203c" should read --element 203c aims--.
    Line 46, ""n-the" should read --n-th--.

COLUMN 25

Line 4, "th" should read --the--.
    Line 22, "of said" should be deleted.
    Line 23, "plurality corresponding to" should read --corresponding to said plurality of--.
    Line 41, "corresponding to" should read --of--.
    Line 42, "of" should read --corresponding to--.
    Line 47, "and" should read --said--.
    Line 66, "produce," should read --produce--.

UNITED STATES PATENT AND TRADEMARK OFFICE
CERTIFICATE OF CORRECTION

PATENT NO. : 5,313,245
DATED : May 17, 1994
INVENTOR(S) : KAZUKI KONISHI

It is certified that error appears in the above-indentified patent and that said Letters Patent is hereby corrected as shown below:

COLUMN 26

Line 5, "average value" should be deleted."
    Line 14, "frame which," should read --frame,--.

COLUMN 27

Line 28, "frame which," should read --frame,--.
    Line 46, "an" should be deleted.
    Line 47, "average" should read --an average--.

COLUMN 28

Line 15, "value," should read --value--.
    Line 37, "tance" should read --tance measuring--.
    Line 41, "means." should read --portions.--.
    Line 57, "An" should read --A--.

COLUMN 29

Line 17, "aid" should read --said--.

COLUMN 31

Line 34, "frame the" should read --frame which are respectively indicative of the nearest distance and the--.
    Line 62, "relatively" should read --respectively--.

UNITED STATES PATENT AND TRADEMARK OFFICE
CERTIFICATE OF CORRECTION

PATENT NO. : 5,313,245
DATED : May 17, 1994
INVENTOR(S) : KAZUKI KONISHI

It is certified that error appears in the above-indentified patent and that said Letters Patent is hereby corrected as shown below:

COLUMN 32

Line 2, "to" should read --of--.
Line 13, "tance is" should read --tance information value indicative of the farthest distance is--.
Line 53, "to" should read --of--.
Line 68, "juding" should read --judging--.

COLUMN 33

Line 63, "relatively" should read --relative--.

COLUMN 34

Line 5, "reference" should read --preference--.
Line 34, "values" should read --value--.
Line 45, "fist" should read --first--.
Line 60, "claim 76," should read --claim 70,--.

COLUMN 35

Line 24, "adjustment values" should read --adjustment information on the basis of one of the distance information values--.
Line 33, "processing" should read --processing means--.
Line 37, "means." should read --frame.--.

UNITED STATES PATENT AND TRADEMARK OFFICE
CERTIFICATE OF CORRECTION

PATENT NO. : 5,313,245
DATED : May 17, 1994
INVENTOR(S) : KAZUKI KONISHI

It is certified that error appears in the above-indentified patent and that said Letters Patent is hereby corrected as shown below:

COLUMN 37

Line 20, "the middle" should read --the distance information value indicative of the middle--.
Line 25, "objects" should read --object--.
Line 30, "furthest" should read --farthest--.
Line 44, "wherein" should read --wherein said--.
Line 56, "of" should read --of a--.
Line 66, "objects" should read --object--.

COLUMN 38

Line 23, "juding" should read --judging--.
Line 51, "then" should read --than--.
Line 68, "process" should read --processing--.

CLAIM 40

Line 26, "process" should read --processing--.

COLUMN 43

Line 7, "from" should read --form--.
Line 35, "objects" should read --object--.

COLUMN 44

Line 7, "the" should read --a plurality of--.
Line 35, "wherein said" should read --further--.
Line 36, "deriving" should read --driving--.
Line 38, "wherein said" should read --further--.
Line 63, "device" should read --camera--.

UNITED STATES PATENT AND TRADEMARK OFFICE
CERTIFICATE OF CORRECTION

PATENT NO. : 5,313,245
DATED : May 17, 1994
INVENTOR(S) : KAZUKI KONISHI

It is certified that error appears in the above-indentified patent and that said Letters Patent is hereby corrected as shown below:

COLUMN 45

Line 1, "device" should read --camera--.
Line 6, "device" should read --camera--.
Line 11, "device" should read --camera--.
Line 21, "device" should read --camera--.
Line 26, "the" should read --a--.
Line 31, "device" should read --camera--, and "wherein said" should read --wherein, in--.
Line 36, "device" should read --camera--.
Line 41, "device" should read --camera--.
Line 46, "device" should read --camera--.
Line 51, "device" should read --camera--.
Line 56, "device" should read --camera--.
Line 63, "device" should read --camera--.

COLUMN 46

Line 1, "device" should read --camera--.
Line 8, "device" should read --camera--.
Line 14, "device" should read --camera--.
Line 15, "include" should read --includes--.
Line 20, "device" should read --camera--.
Line 26, "device" should read --camera--.
Line 33, "device" should read --camera--.
Line 42, "device" should read --camera--.
Line 51, "device" should read --camera--.
Line 63, "device" should read --camera--.

UNITED STATES PATENT AND TRADEMARK OFFICE
CERTIFICATE OF CORRECTION

PATENT NO. : 5,313,245
DATED : May 17, 1994
INVENTOR(S) : KAZUKI KONISHI

It is certified that error appears in the above-indentified patent and that said Letters Patent is hereby corrected as shown below:

COLUMN 47

Line 3, "device" should read --camera--.
    Line 13, "device" should read --camera--.
    Line 21, "device" should read --camera--.
    Line 29, "device" should read --camera--.
    Line 37, "device" should read --camera--.
    Line 48, "device" should read --camera--.

COLUMN 48

Line 1, "device" should read --camera--.
    Line 19, "device" should read --camera--.
    Line 24, "device" should read --camera--.
    Line 37, "device" should read --camera--.
    Line 42, "device" should read --camera--.
    Line 52, "device" should read --camera--.
    Line 61, "device" should read --camera--.
    Line 64, "objects" should read --object--.

COLUMN 49

Line 3, "device" should read --camera--.
    Line 11, "device" should read --camera--.
    Line 13, "relatively" should read --relative--.
    Line 16, "device" should read --camera--.
    Line 20, "device" should read --camera--.
    Line 25, "device" should read --camera--.
    Line 33, "device" should read --camera--.

UNITED STATES PATENT AND TRADEMARK OFFICE
CERTIFICATE OF CORRECTION

PATENT NO. : 5,313,245
DATED : May 17, 1994
INVENTOR(S) : KAZUKI KONISHI

It is certified that error appears in the above-indentified patent and that said Letters Patent is hereby corrected as shown below:

COLUMN 50

```
Line 3,  "device" should read --camera--.
Line 9,  "least" should read --least at--.
Line 18, "device" should read --camera--.
Line 22, "device" should read --camera--.
Line 26, "device" should read --camera--.
Line 29, "device" should read --camera--.
Line 30, "drive" should read --driven--.
Line 32, "device" should read --camera--.
```

Signed and Sealed this

Tenth Day of January, 1995

BRUCE LEHMAN

Attest:

Attesting Officer

Commissioner of Patents and Trademarks